United States Patent
Uhkötter et al.

(10) Patent No.: US 12,196,261 B2
(45) Date of Patent: Jan. 14, 2025

(54) FRICTION BEARING AND METHOD FOR LUBRICATING AND COOLING A FRICTION BEARING

(71) Applicant: Rolls-Royce Deutschland Ltd & Co KG, Blankenfelde-Mahlow (DE)

(72) Inventors: Stephan Uhkötter, Berlin (DE); Uwe Kracht, Berlin (DE); Wolfram Kurz-Hardjosoekatmo, Kleinmachnow (DE); Rens Douma, Berlin (DE); Ivo Martin, Schnoeniche (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 133 days.

(21) Appl. No.: 17/896,202

(22) Filed: Aug. 26, 2022

(65) Prior Publication Data

US 2023/0061493 A1 Mar. 2, 2023

(30) Foreign Application Priority Data

Aug. 26, 2021 (DE) ...................... 10 2021 122 161.7

(51) Int. Cl.
*F16C 33/10* (2006.01)
*F16C 32/06* (2006.01)

(52) U.S. Cl.
CPC ...... *F16C 33/1055* (2013.01); *F16C 32/0651* (2013.01); *F16C 33/101* (2013.01); *F16C 2361/61* (2013.01)

(58) Field of Classification Search
CPC .............. F16C 32/0651; F16C 32/0655; F16C 32/0659; F16C 33/101; F16C 33/1055;
(Continued)

(56) References Cited

U.S. PATENT DOCUMENTS

| 3,640,590 A | 2/1972 | Beisemann |
| 4,474,483 A | 10/1984 | Suzuki et al. |

(Continued)

FOREIGN PATENT DOCUMENTS

| DE | 258149 A3 | 7/1988 |
| DE | 69424525 T2 | 9/2000 |

(Continued)

OTHER PUBLICATIONS

German Search Report dated Mar. 25, 2022 from counterpart German Patent Application No. 10 2021 122 161.7.

(Continued)

*Primary Examiner* — James Pilkington
(74) *Attorney, Agent, or Firm* — SHUTTLEWORTH & INGERSOLL, PLC; Timothy J. Klima

(57) ABSTRACT

A friction of a planetary gearbox, having first and second rotatably connected components. Oil adjacent an oil feed pocket of the first component is directed into a bearing clearance. The oil is directed into the pocket by a line that opens into the pocket. An oil supply unit supplies oil to the bearing clearance at a defined pressure. A ratio between the pulse, via which the oil is directed into the bearing clearance and which corresponds to the product of the square of the inflow rate of the oil into the clearance and the oil density, and the pulse of the oil which adheres to the internal side of the second component $\geq 5*10^{-3}$. The pulse of the oil adhering to the second component is equal to the product of the square of the velocity of the oil adhering to the second component and the oil density.

17 Claims, 30 Drawing Sheets

(58) Field of Classification Search
CPC ............... F16C 33/1065; F16C 37/002; F16H 57/0479; F16H 2057/085
See application file for complete search history.

(56) References Cited

U.S. PATENT DOCUMENTS

| | | | | |
|---|---|---|---|---|
| 4,719,818 | A * | 1/1988 | McCreary | F02B 37/105 |
| | | | | 475/159 |
| 5,101,544 | A | 4/1992 | Kubik | |
| 5,567,056 | A * | 10/1996 | Blase | F16C 33/1055 |
| | | | | 384/380 |
| 6,053,636 | A | 4/2000 | Pelfrey et al. | |
| 8,172,716 | B2 * | 5/2012 | McCune | F02C 7/36 |
| | | | | 475/331 |
| 8,690,721 | B2 * | 4/2014 | McCune | F16H 57/043 |
| | | | | 475/159 |
| 2013/0319006 | A1 | 12/2013 | Parnin et al. | |
| 2020/0347882 | A1 | 11/2020 | Martin et al. | |
| 2023/0061176 | A1 * | 3/2023 | Uhkötter | F02C 7/36 |
| 2023/0061493 | A1 * | 3/2023 | Uhkötter | F16C 33/1055 |
| 2023/0065946 | A1 * | 3/2023 | Uhkötter | F02C 7/36 |
| 2023/0068219 | A1 * | 3/2023 | Schütt | F16C 32/0651 |

FOREIGN PATENT DOCUMENTS

| | | |
|---|---|---|
| DE | 60303052 T2 | 8/2006 |
| DE | 102006010698 A1 | 9/2007 |
| DE | 102009012398 A1 | 9/2010 |
| DE | 102015219752 A1 | 4/2017 |
| DE | 102017216192 A1 | 3/2019 |
| GB | 1192422 A | 5/1970 |

OTHER PUBLICATIONS

German Search Report dated Mar. 29, 2022 from related German App DE 102021122164.1.
German Search Report dated Mar. 29, 2022 from related German App DE 102021122169.2.
German Search Report dated Mar. 25, 2022 from related German App DE 102021122156.0.
Arthur H. Lefebvre and Dilip R. Ballal, Third Edition Gas Turbine Combustion Alternative Fuels and Emissions, 2010, Chapter 4 Aerodynamics, pp. 113-151, CRC Press.

* cited by examiner

FRICTION BEARING AND METHOD FOR LUBRICATING AND COOLING A FRICTION BEARING

CROSS-REFERENCE TO RELATED APPLICATIONS

This application claims priority to German Patent Application DE102021122161.7 filed Aug. 26, 2021, the entirety of which is incorporated by reference herein.

BACKGROUND OF THE INVENTION

The present disclosure relates to a friction bearing, in particular a friction bearing of a planetary gearbox, having a first rotationally fixed component and a second component rotatably connected thereto. The present disclosure furthermore relates to a method for cooling and lubricating such a friction bearing.

Apart from rolling bearings, friction bearings are the most frequently used type of bearing in the construction of machinery and equipment. Here, the two parts that move relative to one another in the friction bearing are in direct contact. Said two parts slide on one another counter to the resistance caused by dynamic friction. This can be kept low by selecting a low-friction pair of materials, by lubrication or by the production of a lubricating film which separates the two contact surfaces. If the two parts come into contact, which is the case with most friction bearings that are used, wear occurs on the contact surfaces, limiting the service life of a friction bearing. In the case of full fluid lubrication, the generation of the separating lubricating film requires additional expenditure. The frictional resistance has the effect that some of the kinetic energy is converted into heat energy, which flows into the two bearing parts and may have to be dissipated.

Friction bearings are differentiated inter alia according to frictional resistance. In this context, a distinction is drawn between simple friction bearings, hydrodynamic friction bearings and hydrostatic friction bearings. Simple friction bearings are either non-lubricated, or lubricated by means of a lubricant, such as grease. Depending on the design of a friction bearing, the frictional resistance results from what is known as solid body friction, mixed friction or fluid friction.

In the case of friction bearings with solid body friction, which is often also referred to as dry friction, low-friction pairings of materials are used. Sometimes, one of the two partners has what is known as a self-lubricating property. The second partner is generally produced from steel.

In turbines and generators, use is often made of friction bearings, the frictional resistance therebetween resulting from fluid friction. The desired lubricating film in the bearing clearance must be put under pressure to ensure that the contact surfaces can be separated from one another counter to the bearing force. In the case of hydrostatic friction bearings, an oil pump is used for this purpose. In contrast, the oil pressure in the lubricating film in the case of "hydrodynamic" friction bearings is produced by the contact surfaces themselves as they move relative to one another.

In the case of gearboxes which are used in gas turbine engines of aircraft, there are special requirements set for friction bearings owing to the limited amount of oil available and the, in some cases, high operating temperatures. In addition, a total weight of a gas turbine engine should be as low as possible. However, this requirement demands that a rigidity of the design is characterized by a lower rigidity in comparison with conventional applications, such as stationary industrial applications.

Owing to the high loads in the region of friction bearings of gearboxes of gas turbine engines, unwanted thermal deformations can occur in the region of a friction bearing, said thermal deformations having a negative effect on functionality and operating safety. Moreover, only a small part of the oil flow supplied reaches the highly loaded region of a friction bearing, where the highest temperatures occur. The effect is that, in the more highly loaded regions of such friction bearings, high local temperatures occur, and these may also be critical for the coating in the region of the bearing surfaces.

The lubricant, or the oil, respectively, in the region of friction bearing pockets, or oil feed pockets, respectively, is directed into the bearing clearance of a friction bearing. The friction bearing pockets here represent lubricant volumes which have been added by virtue of construction and are not provided in the rotating component of the friction bearing. These lubricant volumes can be, for example, machined recesses or cut-outs, the shapes of the latter varying as a function of the respective specific application. Furthermore, the feeding of the lubricant into such a friction bearing pocket in most instances takes place by way of bores, or ducts which are configured in an angular or funnel-shaped manner.

The oil from the friction bearing pocket in the bearing clearance is transported in the circumferential direction of the friction bearing and in the rotation direction of the rotatably embodied bearing shell into the bearing clearance that converges as a function of the loading in the circumferential direction. This means that a bearing clearance height in the circumferential direction of a friction bearing is smaller in more highly loaded regions than in circumferential regions of the friction bearing that are loaded to a lesser extent and in which an oil feed pocket is usually provided. A substantial part of the fed lubricant is squeezed laterally out of the friction bearing in the converging lubrication clearance. The converging bearing clearance has its tightest lubrication clearance in the circumferential region of a friction bearing in which the highest load bearing capability of the friction bearing is required. In the process, the lubricant in the region of the tightest lubrication clearance is significantly heated by the shear friction prevalent there. In the circumferential direction of the bearing clearance, the heating primarily takes place in the region of the tightest lubrication clearance and in the rotation direction just after the tightest lubrication clearance, wherein the highest bearing temperatures in the axial extent of the friction bearing arise in the center of the friction bearing.

After the region in which the tightest lubrication clearance is present during operation, the height of the lubrication clearance increases again. A certain quantity of lubricant, which is entrained from the region of the tightest lubrication clearance and is characterized by a high operating temperature, is present in this so-called diverging lubrication-gap circumferential region of a friction bearing. Since the entrained quantity of lubricant from the tightest lubrication clearance is very minor, the bearing clearance region which adjoins the tightest lubrication clearance, and of which the bearing clearance height increases again in the circumferential direction and in the direction of the friction bearing pocket, is only partially filled with lubricant. By virtue of the centrifugal force that engages on the lubricant during the operation of a friction bearing, the lubricant is conveyed radially outward onto the outer bearing shell, or onto the internal side of the friction bearing, respectively. The lubricant which in the axial direction bears on the rotating component in the center of the friction bearing and which has a high operating temperature and is also referred to as dragged lubricant, in the region of the friction bearing pocket, or the feed region of the lubricant into the friction bearing, respectively, is only insufficiently displaced by fresh cold lubricant, or mixes with the latter only to an insufficient extent. However, this compromises a load bearing capability of a friction bearing to an undesirable degree.

In order to be able to delimit the friction bearing temperature in the highly loaded region to permissible temperatures, undesirably high volumetric flows of lubricant have to be directed into the friction bearing, which cause large power losses and place higher demands on the lubrication system and thus cause costs and additional weight and increase fuel consumption in particular in the aircraft engine sector.

BRIEF SUMMARY OF THE INVENTION

The present disclosure is therefore based on the object of making available a friction bearing, in particular a friction bearing of a planetary gearbox, having a first rotationally fixed component and a second component rotatably connected thereto, said friction bearing being characterized by a high load bearing capability and by minor power losses. The present disclosure is additionally based on the object of achieving a method for cooling and lubricating such a friction bearing.

This object is achieved by a friction bearing and by a method having the features as disclosed herein. Advantageous developments form the subject matter of the following description.

Proposed is a friction bearing, in particular a friction bearing of a planetary gearbox, preferably a planetary gearbox of an aircraft engine, having a first rotationally fixed component and a second component rotatably connected thereto. Oil in the region of an oil feed pocket, or a friction bearing pocket, respectively, of the first component is able to be directed into the bearing clearance of the friction bearing between the components. The oil is able to be directed into the oil feed pocket by way of at least one line that opens into the oil feed pocket.

The term rotationally fixed first component here is understood to be a component of planetary gearbox which is embodied so as to be rotationally fixed in terms of the bearing axis of a friction bearing, wherein the bearing axis of the friction bearing may be embodied so as to be stationary or may rotate about a further axis.

There is the possibility that the first component is a planet pin of a planetary gearbox, the second component, such as a planet gear, being rotatably mounted on said planet pin. The first component, or the planet pin, respectively, can be connected in a rotationally fixed manner to a planet carrier which can be embodied so as to be rotationally fixed or rotatable per se.

The friction bearing of the present disclosure can additionally have an oil supply unit by way of which the oil is able to be fed to the bearing clearance at a defined pressure. The oil supply unit and a flow cross section of the at least one line here can be specified so that a ratio between the impulse by way of which the oil from the line is directed into the bearing clearance and the impulse of the oil which adheres to the internal side of the second component is at least $5 \times 10^{-3}$. The impulse of the oil directed in here corresponds to the product of the square of the inflow rate of the oil into the bearing clearance and the density of the oil. The impulse of the oil adhering to the second component is equal to the product of the square of the velocity of the oil adhering to the second component and the density of the oil.

This embodiment of the friction bearing is based on the concept that, when the impulse ratio is equal to or higher than $5 \times 10^{-3}$, the hot dragged lubricant is displaced laterally in the axial direction of the friction bearing by the fed fresh oil and is squeezed out laterally in the profile of the converging gap. In this way, the cold lubricant remains primarily in the axial center of the friction bearing and is dragged into the tightest lubrication clearance in the desired manner. As a result, the rotating second component by virtue of the impact of the cold lubricant jet is better cooled by the impulse required therefor, and cooled more centrically in axial terms.

In order to be able to push the hot dragged oil laterally out of the bearing clearance of the friction bearing to the desired degree by the fresh oil fed, according to the present disclosure the fresh oil in the axial direction of extent of the friction bearing can in a simple manner be directed into the oil feed pocket so as to be as centric as possible. It can be provided herein that the region of the oil feed pocket in which the fresh oil is directed into the bearing clearance of the friction bearing, proceeding from the bearing center in a preferably symmetrical manner in the direction of the bearing external sides, extends across a length which corresponds to up to 25% of the entire axial bearing width of the friction bearing.

An impulse-rich oil feed into the bearing clearance is guaranteed at impulse ratios of more than $5 \times 10^{-3}$. To this end, the lubricant outside the friction bearing can already be pressurized to a correspondingly high pressure by way of the oil supply unit and thereafter, by means of correspondingly embodied flow cross sections in the port region of the line, and also already ahead of the port region of the line, i.e. already in the line and prior to entering the friction bearing pocket, be accelerated to a corresponding degree. The lubricant accelerated in this manner in the bearing clearance then impacts the hot dragged lubricant and also the hot rotating shell of the bearing, or the internal side of the second component, respectively.

The profile of the at least one line can, jointly with the radial direction of the bearing clearance, enclose an angle which is specified to direct the oil from the line into the oil feed pocket in the bearing clearance at an angle of approximately 5° to 60° in relation to the radial direction of the bearing clearance and in the main rotation direction of the second component in relation to the first component. In this instance, the fresh lubricant is able to be transported in a targeted manner into the converging bearing clearance, and a lateral proliferation of the fresh lubricant in the axial direction is minimized because the fresh lubricant is transported so as to be more centric in the bearing clearance and in the direction of the tightest lubrication clearance. Since the supporting region primarily arises in the axial center of the friction bearing, the fresh lubricant can act in a more targeted manner here. The reduced temperature has the effect of a higher viscosity and thus an improved load bearing capability.

Alternatively thereto, there is also the possibility that the at least one line, conjointly with the radial direction of the bearing clearance, encloses an angle which is specified to direct the oil from the line into the oil feed pocket at an angle of approximately 5° to 20° in relation to the radial direction of the bearing clearance and in the circumferential direction of the bearing clearance and counter to the main rotation direction of the second component in relation to the first component. The angled position of the lubricant jet counter to the rotation direction of the second component resulting therefrom has the effect that the jet impulse, or the jet impulse of the oil discharged, counteracts the hot dragged oil on the internal wall of the second component. As a result, the cold oil upon impacting the internal side of the rotating second component is accelerated in the desired manner by the latter. The accelerated oil, by virtue of the centrifugal force engaging thereon, then displaces the dragged hot oil in the bearing clearance outward in the axial direction and directs said hot oil out of the bearing clearance.

Alternatively thereto or in combination therewith, the at least one line can in each case be embodied with at least one first line portion and, adjoining the latter in the feed direction of the oil into the oil feed pocket, a second line portion. The line portions can in each case have a profile aligned in the radial direction of the bearing clearance. Additionally, there is the possibility that the flow cross section of the first line portion is smaller than the flow cross section of the second line portion. The line portions can be mutually disposed such that the flow cross section for the oil, proceeding from the first line portion in the direction of the second line portion, in the circumferential direction of the bearing clearance and in the main rotation direction of the second component in relation to the first component, increases more than counter to the main rotation direction of the second component. Alternatively thereto, there is also the possibility that the flow cross section for the oil, proceeding from the first line portion in the direction of the second line portion, in the circumferential direction of the bearing clearance and counter to the main rotation direction of the second component, increases more than in the main rotation direction of the second component.

As a result of the arrangement of the flow cross sections of the two line portions, the latter being in each case mutually offset, the jet is guided eccentrically through the line, and the so-called Coandă effect is generated or exploited, respectively. As a result, the lubricant jet guided from the line into the bearing clearance is deflected in the rotation direction of the second component in relation to the first component, or counter to the main rotation direction of the second component, and in the process guided through the bearing clearance in each case obliquely in relation to the radial direction of the bearing clearance, in the direction of the internal side of the second component. There, the oil being fed displaces the hot oil dragged from the tightest bearing clearance and adhering to the internal side of the second component, said hot oil, by virtue of the centrifugal force arising during the operation of the friction bearing, bearing on the internal side of the rotating second component and being entrained by the latter.

As a result of the oblique induction into the bearing clearance, the fresh lubricant, in an ideally centric manner in the axial direction of the friction bearing and in the circumferential direction, as well as in the main rotation direction of the second component in the friction bearing, is transported away from the oil feed pocket in the direction of the tightest lubrication clearance. Since the region of the friction bearing that is impinged with the highest bearing loads arises primarily in the axial center of the friction bearing, the fresh lubricant can act in a more targeted manner here. The reduced operating temperature has the effect of a higher viscosity of the lubricant in the highly loaded region of the friction bearing, and thus of an improved load bearing capability of the friction bearing.

The exploitation of the so-called Coandă effect in comparison to an obliquely running line offers a simpler producibility of a friction bearing, because obliquely running bores in most instances require more installation space than lines that run in stages and in the radial direction.

In a further embodiment of the friction bearing according to the present disclosure, the at least one line is embodied with a discharge installation. By means of the discharge installation a width of the oil jet directed from the port region of the line into the bearing clearance is able to be enlarged in the circumferential direction of the bearing clearance as the spacing from the port region of the line increases. The fanning of the oil jet that is directed into the bearing clearance, said fanning being achieved by way of the discharge installation, likewise reduces the axial distribution of the fresh lubricant in the bearing clearance, as a result of which the centric friction bearing region is in turn impinged with fresh cool lubricant to the desired degree.

At least one further or second line, by way of which oil is likewise able to be directed into the oil feed pocket, is provided. The port region of the second line into the oil feed pocket in the circumferential direction of the bearing clearance and in the main rotation direction of the second component in relation to the first component and/or in the axial direction of the friction bearing is spaced apart from the port region of the first line into the oil feed pocket.

The proposed arrangement of the port regions of the lines, or of the oil supply lines, respectively, into the friction bearing pocket in a simple manner in terms of construction offers the possibility of better displacing dragged oil in the bearing clearance from the latter in an axially outward manner, and of reducing the temperature level in the friction bearing. Furthermore, the mutual arrangement of the port regions offers the possibility of restricting or avoiding, respectively, the hot dragged oil, or lubricant, respectively, mixing with the fed cold fresh oil. As a result of the two aforementioned improvements, a load bearing capability of a friction bearing is increased in a simple manner. Furthermore, the improved feeding of fresh lubricant ensures adequate cooling and lubricating of the highly loaded bearing region.

The term main rotation direction is presently understood to be the rotation direction of the second component in relation to the first component, the second component in comparison to the first component having a substantially longer service life for said main rotation direction than for the rotation direction counter thereto.

In principle, the present disclosure relates to the oil feed into a friction bearing, in particular for a friction bearing of a so-called high performance gearbox. As a result of the mutual disposal of the port regions of the lines, the oil feed is designed so that the hot dragged lubricant from the tightest bearing clearance, while adhering to the rotating wall of the second component, is effectively displaced by cold fresh lubricant being fed, the hot rotating internal wall of the second component also being cooled. As a result of the effective displacement and cooling, cold lubricant is guided primarily into the tightest lubrication clearance. The load bearing capability of the friction bearing is increased as a result, and the quantity of the fresh lubricant being fed can be reduced in comparison to known solutions. As a result, the cooling circuit of a high performance gearbox is more efficient and can thus be of smaller dimensions.

Depending on the respective specific application or specific load, respectively, there is the possibility for the oil feed pocket and/or the port regions of the lines into the oil feed pocket to be in each case disposed in the axial extent of the friction bearing so as to be in the center of the friction bearing, or so as to be eccentric in the friction bearing. As a result, it can be guaranteed with minor complexity in terms of construction that the respective zone, which in the axial direction of the friction bearing is exposed to the highest load, is supplied with oil that is as cool as possible.

In a further embodiment of the friction bearing according to the present disclosure, a third line opens into the oil feed pocket. The port region of the third line in the circumferential direction of the bearing clearance and in the main rotation direction of the second component in relation to the first component can have substantially the same spacing from the port region of the first line as the port region of the second line has from the port region of the first line. In this instance, the port region of the third line in the circumferential direction is disposed directly next to the port region of the second line.

Depending on the respective specific application, it can also be provided that the spacing between the port region of the third line and the port region of the first line in the circumferential direction and in the main rotation direction of the rotatable component deviates from the spacing in the circumferential direction between the port region of the first line and the port region of the second line, so as to achieve ideally positive cooling of the highly loaded region of the friction bearing.

Additionally, there is the possibility that the port region of the third line in the axial direction of the friction bearing is spaced apart from the port region of the second line as well as from the port region of the first line. The axial spacings between the port regions of the lines can in each case be mutually adapted so that the port region of the first line in the axial direction of the friction bearing is positioned between the port region of the second line and the port region of the third line.

There is again the possibility here that the port regions of the lines have a so-called mutual A arrangement, wherein the port region of the first line in the circumferential direction and in the main rotation direction of the second component in relation to the first component is disposed ahead of the port regions of the second line and of the third line, and in the axial direction is provided between the port regions of the second line and the third line.

Such an arrangement of the port regions of the lines has the effect that the volumetric flow of oil, which by way of the first line is directed into the oil feed pocket, is kept centric in the circumferential direction and in terms of the axial extent of the friction bearing by the volumetric flows of oil from the second line and the third line which are directed later into the bearing clearance, as a result of which the cooling effect in the highly loaded region of the friction bearing is yet again improved in comparison to known friction bearings.

The axial spacings between the port regions of the lines and the spacings between the port regions of the lines in the circumferential direction of the bearing clearance and in the main rotation direction of the second component in relation to the first component are mutually adapted to a defined degree with a view to improved cooling and lubricating. The adaptation here can be in such a manner that the port region of the second line and the port region of the third line are disposed within a sector, the center thereof lying in the port region of the first line and enclosing an angle of approximately 120°.

In a further embodiment of the friction bearing according to the present disclosure, a fourth line opens into the oil feed pocket. The port region of the fourth line in the axial direction of the friction bearing is spaced apart from the port region of the first line and in the circumferential direction of the bearing clearance and in the main rotation direction of the second component in relation to the first component can be disposed next to the port region of the first line, or spaced apart from the port region of the first line. Additionally, there is the possibility of in each case mutually adapting the spacings of the port regions of the lines so that the port regions of the first line and of the fourth line in the axial direction of the friction bearing are disposed between the port regions of the second line and of the third line.

The axial spacings between the port regions of the lines as well as the spacings between the port regions of the lines in the circumferential direction of the bearing clearance and in the main rotation direction of the second component in relation to the first component can additionally be adapted to a further defined degree. There is the possibility here that the port regions of the second line and of the third line are disposed within a sector, the center thereof lying in a region of the oil feed pocket in which the port regions of the first line and of the fourth line are provided. The sector can again enclose an angle of approximately 120° so that the volumetric flows of oil, which by way of the first line and the fourth line are directed into the oil feed pocket, are kept and guided so as to be ideally centric in the bearing clearance of the friction bearing by the volumetric flows of oil which are directed in each case laterally with respect to the oil feed pocket and in the circumferential direction later into the oil feed pocket. As a result, cooling of the friction bearing according to the present disclosure is improved in a simple manner in terms of construction in comparison to known solutions.

Moreover, there is also the possibility of providing the mutual arrangement of the port regions of the lines as a function of the bearing width in the axial direction of the friction bearing, so as to avoid that the volumetric flow of oil, which from the first line is directed into the bearing clearance, is prematurely pushed laterally out of the bearing clearance by means of the volumetric flows of oil which are in each case directed into the bearing clearance from the second line and from the third line.

In further embodiments of the friction bearing according to the present disclosure, the port regions of the first line, or the port regions of the first line and of the fourth line, can be disposed in the region of an axial friction bearing center which extends across at most 25% of the axial bearing width of the friction bearing.

Furthermore, there is the possibility that the port regions of the second line and of the third line are disposed in the region of an axial friction bearing center which extends across at most 50% of the bearing width of the friction bearing.

The spacing between the port region of the first line and the port region of the second line in the circumferential direction and in the main rotation direction of the second component, as a function of the respective specific application, can correspond to at most four times the diameter of the opening cross section of the port region of the first line, or to at most 10% of the entire bearing circumference of the friction bearing.

In further embodiments of the friction bearing according to the present disclosure, there is the possibility that the spacing between the port region of the first line and the port region of the third line in the circumferential direction and in the main rotation direction of the second component corresponds to at most four times the diameter of the opening cross section of the port region of the first line, or to at most 10% of the entire bearing circumference of the friction bearing.

The axial spacings between the port region of the first line and the port region of the second line, as well as between the port region of the first line and the port region of the third line, can in each case correspond to at most four times the diameter of the opening cross section of the port region of the first line.

Depending on the respective specific application, there is also the possibility that the port region of the first line and/or the port region of the second line and/or the port region of the third line and/or the port region of the fourth line are/is embodied so as to be circular, elliptic, rectangular, funnel-shaped or slot-shaped (see FIG. 23a), so as to be able to direct the lubricant, or the oil, respectively, into the bearing clearance in each case in a manner by way of which an ideally high cooling performance can be achieved.

In further advantageous embodiments of the friction bearing according to the present disclosure, the size of the opening cross section of the port region of the first line and/or the size of the opening cross section of the port region of the fourth line deviate/deviates from the size of the opening cross section of the port region of the second line and/or from the size of the opening cross section of the port region of the third line, so as to be better able to control the temperature of the highly loaded zone of the friction bearing to the desired extent. There is the possibility here for the port regions of the first line and of the fourth line to be embodied so as to be larger than the opening cross sections of the port regions of the second line and of the third line.

The first line and/or the fourth line can be impinged by oil from a first oil circuit, and the second line and/or the third line can be impinged by oil from a second oil circuit.

In a simple manner in terms of construction, this offers the possibility of supplying the friction bearing with a volumetric flow of oil from the first line and/or from the fourth line, the temperature of said volumetric flow of oil being lower than the temperature of the volumetric flow of oil that is in each case directed into the bearing clearance by way of the second line and/or the third line.

As a result of the last approach described above, an increased load bearing capability of the friction bearing in comparison to known friction bearing solutions is again achieved in a simple manner. Furthermore, an oil system with a lower cooling performance can also be conceived and, therefore, be operated more efficiently.

Furthermore proposed is a method for cooling and lubricating a friction bearing, in particular a friction bearing described in more detail above and according to the present disclosure. Here, the oil by way of a first line and/or a fourth line is directed into the bearing clearance at a lower temperature than the oil that is directed into the bearing clearance by way of a second line and/or a third line.

This approach is based on the concept that, for example, the volumetric flow of oil from the first line that is fed so as to be ideally centric, or the volumetric flows of oil from the first line and from the fourth line that are fed so as to be ideally centric, is/are protected against laterally fanning by the warmer volumetric flows of oil that in the axial direction are in each case fed in on the outside from the second line and from the third line. In this way, the highly loaded centric region of the friction bearing is impinged with an ideally large quantity of cool lubricant, and a substantial improvement in terms of the load bearing capability of the friction bearing according to the present disclosure in comparison to the known friction bearing solutions is achieved.

Alternatively or additionally, oil from an oil supply unit is directed into the bearing clearance of the friction bearing according to the present disclosure in such a manner that the impulse ratio is at least $5\times10^{-3}$.

Again additionally or alternatively to the two approaches described above, it can additionally be provided that the oil is directed into the bearing clearance and in the direction of an internal side of the second component either in the main rotation direction of the second component at an angle of 5° to 60°, or counter to the main rotation direction of the second component at an angle of 5° to 20°, in relation to the radial direction of the friction bearing.

In principle, the present disclosure is based on the intention of, by means of a targeted distribution of the feed bores into the oil feed pocket, exploiting the application-dependent different feed temperatures of the oil that is directed into the oil feed pocket, and the flow conditions in the bearing clearance of the friction bearing according to the present disclosure associated therewith, so as to supply and cool the friction bearing in an optimal manner with lubricant.

One embodiment of the friction bearing according to the present disclosure is distinguished by the use of a plurality of oil feeds into the friction bearing pocket, said oil feeds being supplied with flows of lubricant controlled to different temperatures. As a result of one or a plurality of cold feeds in the axial center of the oil feed pocket, and as a result of the eccentric feed of warmer flows of lubricants, the cold centric lubricant can be kept in the axial center by means of being blocked by the eccentric warmer lubricant. As a result, the temperature in the tightest bearing clearance is able to be reduced in a simple manner in comparison to conventional friction bearings, and the load bearing capability of the friction bearing is improved by virtue of the consequently increased viscosity of the oil in the bearing clearance.

Directing the oil into the bearing clearance in an angular manner in relation to the radial direction of the bearing clearance and in or counter to the main rotation direction of the second component, offers in a simple manner the possibility of transporting the fresh lubricant in a targeted manner into the converging bearing clearance and of minimizing a lateral proliferation of the fresh lubricant in the axial direction, because the fresh lubricant as a result is guided so as to be more centric in the bearing clearance and in the direction of the tightest lubrication clearance. Since the supporting region primarily arises in the axial center of the friction bearing, the fresh lubricant can act in a more targeted manner here. The reduced temperature has the effect of a higher viscosity and thus an improved load bearing capability.

If the oil from the line is directed into the oil feed pocket at an angle in relation to the radial direction of the bearing clearance and in the circumferential direction of the bearing clearance and counter to the main rotation direction of the second component in relation to the first component, the lubricant jet which is directed into the bearing clearance counter to the rotation direction of the second component has the effect that the jet impulse, or the jet impulse of the discharged oil, respectively, counteracts the hot dragged oil on the internal wall of the second component. As a result, the hot oil upon impacting the internal side of the rotating second component is accelerated in the desired manner by the latter. The accelerated oil, by virtue of the centrifugal force engaging thereon, then displaces the dragged hot oil in the bearing clearance outward in the axial direction and directs said hot oil out of the bearing clearance.

The present disclosure furthermore relates to a planetary gearbox of an aircraft engine, in which a planet gear by way of a friction bearing described in more detail above is rotatably disposed on a planet pin which is connected in a rotationally fixed manner to a planet carrier of the planetary gearbox.

In an advantageous embodiment of the planetary gearbox according to the present disclosure, the planet carrier is of a rotatably fixed embodiment. With such a design, a main load direction of the friction bearing can enclose an angle of approximately 90° with a radial direction of the planet carrier in the direction of rotation of the planet gear. The at least one duct can then be disposed in a circumferential region of the friction bearing which encloses angular values in a range of from 60° to 150°, preferably of from 90° to 135°, with the radial direction of the planet carrier in the direction of rotation of the planet gear. In addition, there is the possibility that the oil feed pocket is disposed outside a circumferential region of the friction bearing which encloses angular values in a range of from 10° to 120°, preferably of from 10° to 100°, with the radial direction of the planet carrier in the direction of rotation of the planet gear.

In this embodiment of the planetary gearbox according to the present disclosure, it is ensured that the oil feed pocket is disposed outside the highly loaded zone of the friction bearing in the circumferential direction of the friction bearing. The oil can thus be introduced to the desired degree from the oil feed pocket into the bearing clearance of the friction bearing.

Furthermore, it is also possible that the planet carrier of the planetary gearbox according to the present disclosure is rotatable. A main load direction of the friction bearing can then enclose, depending on the operating point, angular values of from 110° to 180° with a radial direction of the planet carrier in the direction of rotation of the planet gear with respect to the carrier element. There is the possibility that the oil feed pocket is disposed outside a circumferential region of the friction bearing which encloses angular values in a range of from 90° to 190°, preferably of from 30° to 210°, with the radial direction of the planet carrier in the direction of rotation of the planet gear. This ensures that the oil feed pocket is disposed outside a highly loaded region of the friction bearing and that oil can be introduced into the bearing clearance between the planet gear and the carrier element with little effort.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The present disclosure is not restricted to the indicated combinations of features of the additional independent claims or claims dependent thereon. There are furthermore possibilities of combining individual features, including those which emerge from the claims, the following description of embodiments and directly from the drawing. Reference to the drawings by the claims while using reference signs is not intended to restrict the scope of protection of the claims.

BRIEF DESCRIPTION OF THE SEVERAL VIEWS OF THE DRAWINGS

Preferred refinements are derived from the dependent claims and the description hereunder. Exemplary embodiments of the subject matter according to the present invention are explained in greater detail with reference to the drawing, without being restricted thereto. In the drawing:

DETAILED DESCRIPTION OF THE INVENTION

Figure 1:
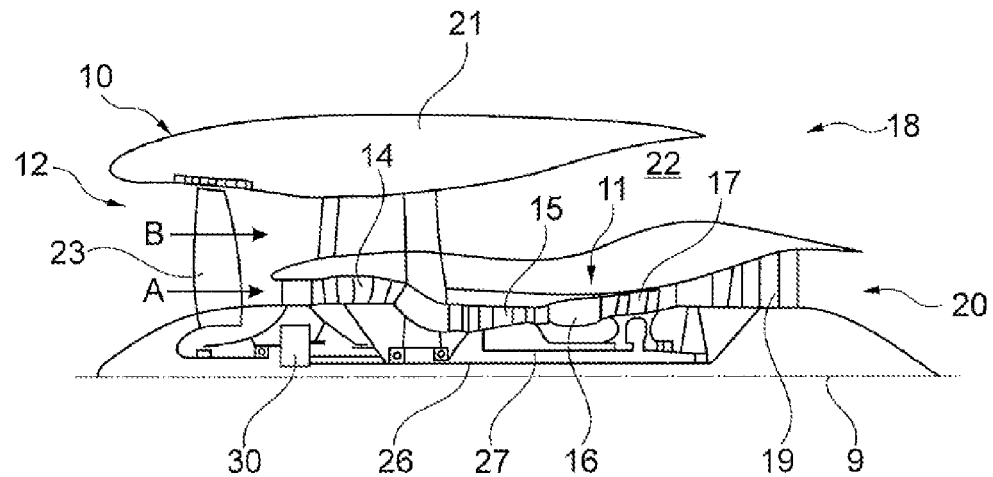
FIG. 1 shows a schematic longitudinal sectional view of a gas turbine engine.

FIG. 1 illustrates a gas turbine engine 10 having a main axis of rotation 9. The engine 10 comprises an air inlet 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gearbox 30. The shaft 26 herein is also referred to as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27, which is also referred to as the core shaft. The fan 23 generally provides the majority of the propulsion force. The epicyclic gearbox 30 is a reduction gearbox.

Figure 2:
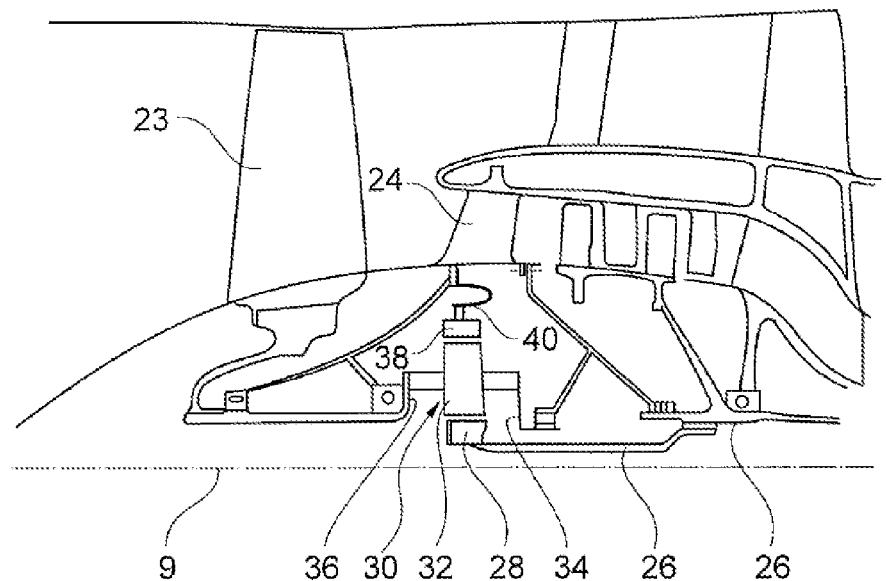
FIG. 2 shows an enlarged, partial, longitudinal sectional view of an upstream portion of a gas turbine engine.

An exemplary arrangement for a geared-fan gas turbine engine 10 is shown in FIG. 2. The low-pressure turbine 19 (see FIG. 1) drives the shaft 26, which is coupled to a sun gear 28 of the epicyclic gear arrangement 30. Multiple planet gears 32, which are coupled to one another by means of a planet carrier 34, are situated radially outside the sun gear 28 and mesh with the latter, and are in each case disposed so as to be rotatable on carrier elements or planet pins 42 which are connected in a rotationally fixed manner to the planet carrier 34 and are shown in detail in FIG. 3. The planet carrier 34 limits the planet gears 32 to orbiting about the sun gear 28 in a synchronous manner while enabling each planet gear 32 to rotate about its own axis on the planet pins 42, which represent static axes. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gearbox output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
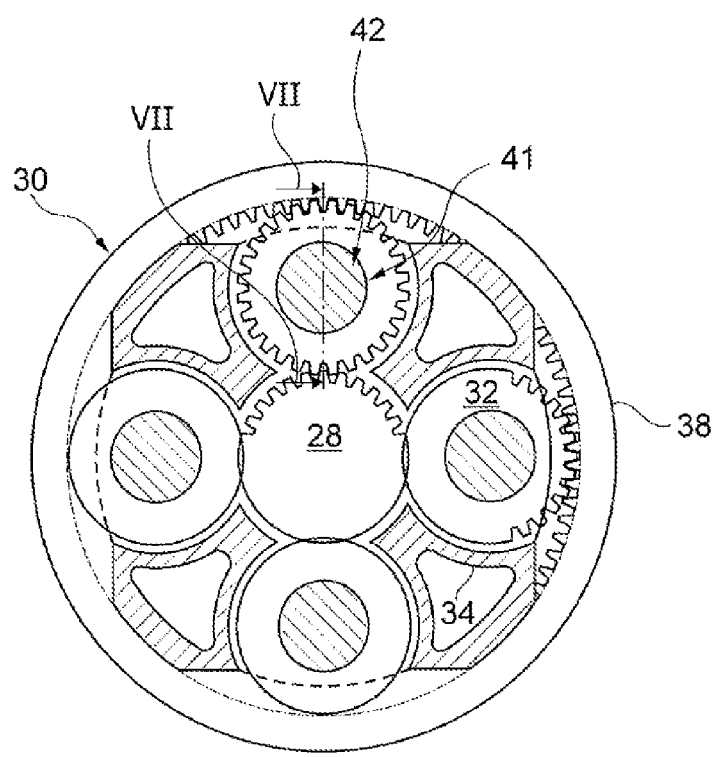
FIG. 3 shows an isolated illustration of a gearbox for a gas turbine engine.

The epicyclic gearbox 30 is shown in greater detail by way of example in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gearbox 30 generally comprise at least three planet gears 32.

The epicyclic gearbox 30 illustrated by way of example in FIGS. 2 and 3 is of the planetary type, in which the planet carrier 34 is coupled to an output shaft via linkages 36, wherein the ring gear 38 is fixed. However, any other suitable type of epicyclic gearbox 30 may be used. As a further example, the epicyclic gearbox 30 may be a star arrangement, in which the planet carrier 34 is held fixed, with the ring gear (or annulus) 38 allowed to rotate. In the case of such an arrangement, the fan 23 is driven by the ring gear 38. As a further alternative example, the gearbox 30 can be a differential gearbox in which both the ring gear 38 and the planet carrier 34 are allowed to rotate.

The geometry of the gas turbine engine 10, and components thereof, is or are defined using a conventional axis system which comprises an axial direction X (which is aligned with the axis of rotation 9), a radial direction Y (in the direction from bottom to top in FIG. 1), and a circumferential direction U (perpendicular to the view in FIG. 1). The axial, radial and circumferential directions X, Y and U are mutually perpendicular.

Figure 4:
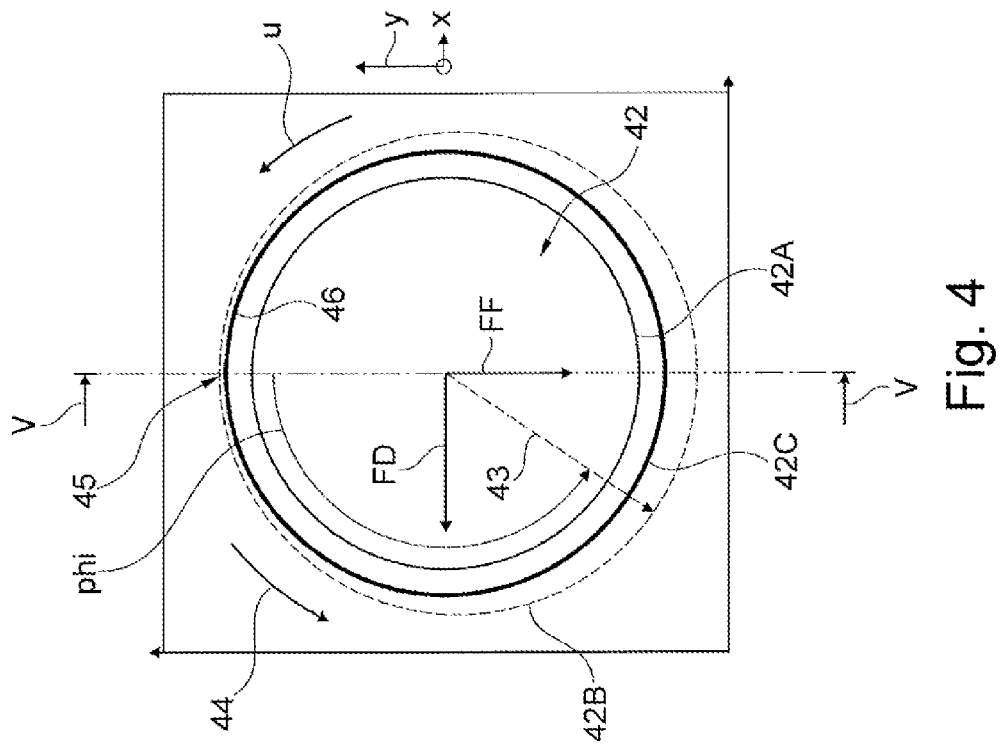
FIG. 4 shows a highly schematic isolated illustration of a planet pin of the planetary gearbox according to FIG. 3, on which a planet gear is rotatably mounted.
Figure 5:
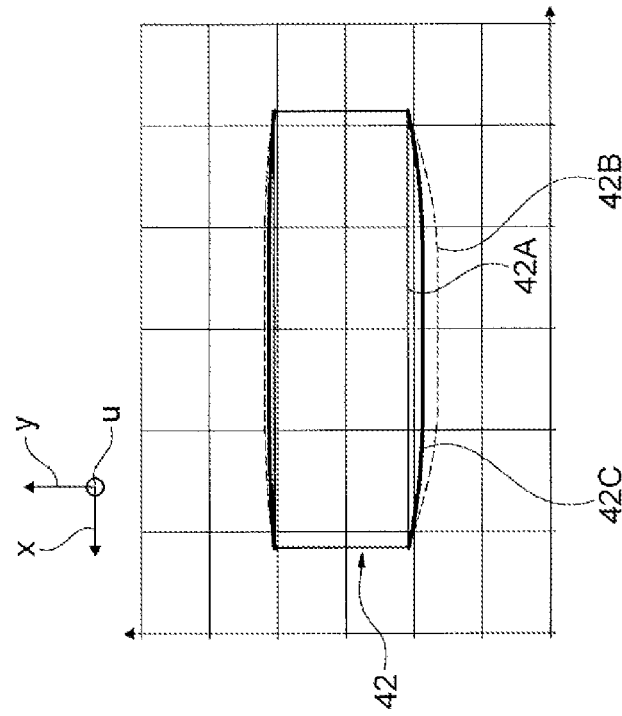
FIG. 5 shows a schematic longitudinal view of the planet pin according to FIG. 4 along a section line IV-IV denoted more specifically in FIG. 4.

FIG. 4 shows the planet pin 42 in isolation in a highly schematic side view, while the planet pin 42 in FIG. 5 is shown in a longitudinal sectional view. A first circular line 42A1 shown in FIG. 4 corresponds to the diameter of the planet pin 42 when the latter is substantially at the ambient temperature of the gas turbine engine 10. In contrast, the further line 42B1 corresponds to the circumference of the planet pin 42 during the operation of the gas turbine engine 10 of a planetary gearbox 30 embodied in a conventional way. In addition, the arrow 43 indicates the main load direction of the friction bearing 41 between the planet gear 32 and the planet pin 42.

The main load direction 43 corresponds to the direction of the resultant bearing force of the friction bearing 41, which is composed of the bearing force component FD and the further bearing force component FF. The bearing force component FD in each case results from the torque applied to the planetary gearbox 30. The further bearing force component FF results from the centrifugal force which acts on the planet gear 32 when the planet carrier 34 is rotating during the operation of the planetary gearbox.

If the planet carrier 34 is of non-rotatable design, the main load direction 43 of the friction bearing 41 corresponds substantially to the direction of bearing force component FD since there is then no centrifugal force acting on the planet gear 32. In addition, the direction of rotation of the planet gear 32 is indicated in FIG. 4 by the reference sign 44.

Bearing force component FD encloses an angle phi equal to 90°, in the direction of rotation 44 of the planet gear 32, with the radial direction of extent of the planet carrier 34, which is the same as the radial direction y in FIG. 4 and passes through the center of the planet pin 42 and the radially outer point 45. Bearing force component FF encloses an angle phi equal to 180°, in the direction of rotation 44 of the planet gear 32, with the radial direction of extent of the planet carrier 34.

When the planet carrier 34 is of rotatable design, the angular value of the angle phi which the main load direction 43 encloses with the radial direction of the planet carrier 34 is in a range of from 110° to 180°, depending on the operating state.

During the operation of the gas turbine engine 10, the outside diameter of the planet pin 42 on the line 42B1 increases to a greater and greater extent in the direction of rotation 44 of the planet gear 32, starting from a radially outer point 45 on an outer side 46 of the planet pin 42. In the region of the planet pin 42 which surrounds the main load direction 43 at the circumference, the outside diameter of the planet pin 42 differs to a substantially greater extent from the circular line 42A than at the radially outer point 45 on the outer side 46 of the planet pin 42. This results from the fact that the non-rotating planet pin 42, which is connected to the planet carrier 34 in a manner precluding relative rotation, is subject to the greatest heat input in the region of the main load direction 43. This is the case because a bearing clearance 63 of the friction bearing 41 between an outer side 46 of the planet pin 42 and an inner side 64 of the planet gear 32 is at its smallest here owing to the acting load.

In contrast, the rotating planet gear 32 does not have locally limited heating corresponding to the planet pin 42 on account of the rotation and thermal inertia. For this reason, the inside diameter of the planet gear 32 expands uniformly in the circumferential direction as the operating temperature of the planetary gearbox 30 increases.

Owing to the different expansion behavior of the planet pin 42 and the planet gear 32, the height of the bearing clearance 63 of the friction bearing 41 is reduced to an even extent in the main load zone extending in the circumferential direction U about the main load direction 43. In the region of the main load zone of the friction bearing 41 and especially in the planet pin 42, this results in very high operating temperatures in a locally limited area. These high operating temperatures prejudice a load-bearing capability and a service life of the friction bearing 41 to an unwanted extent.

FIG. 5 shows a longitudinal sectional view of the planet pin 42 along a section line V-V denoted more specifically in FIG. 4. From the illustration according to FIG. 5, it is evident that the planet pin 42 at relatively high operating temperatures expands to a greater extent centrically than in the region of its ends.

Figure 6:
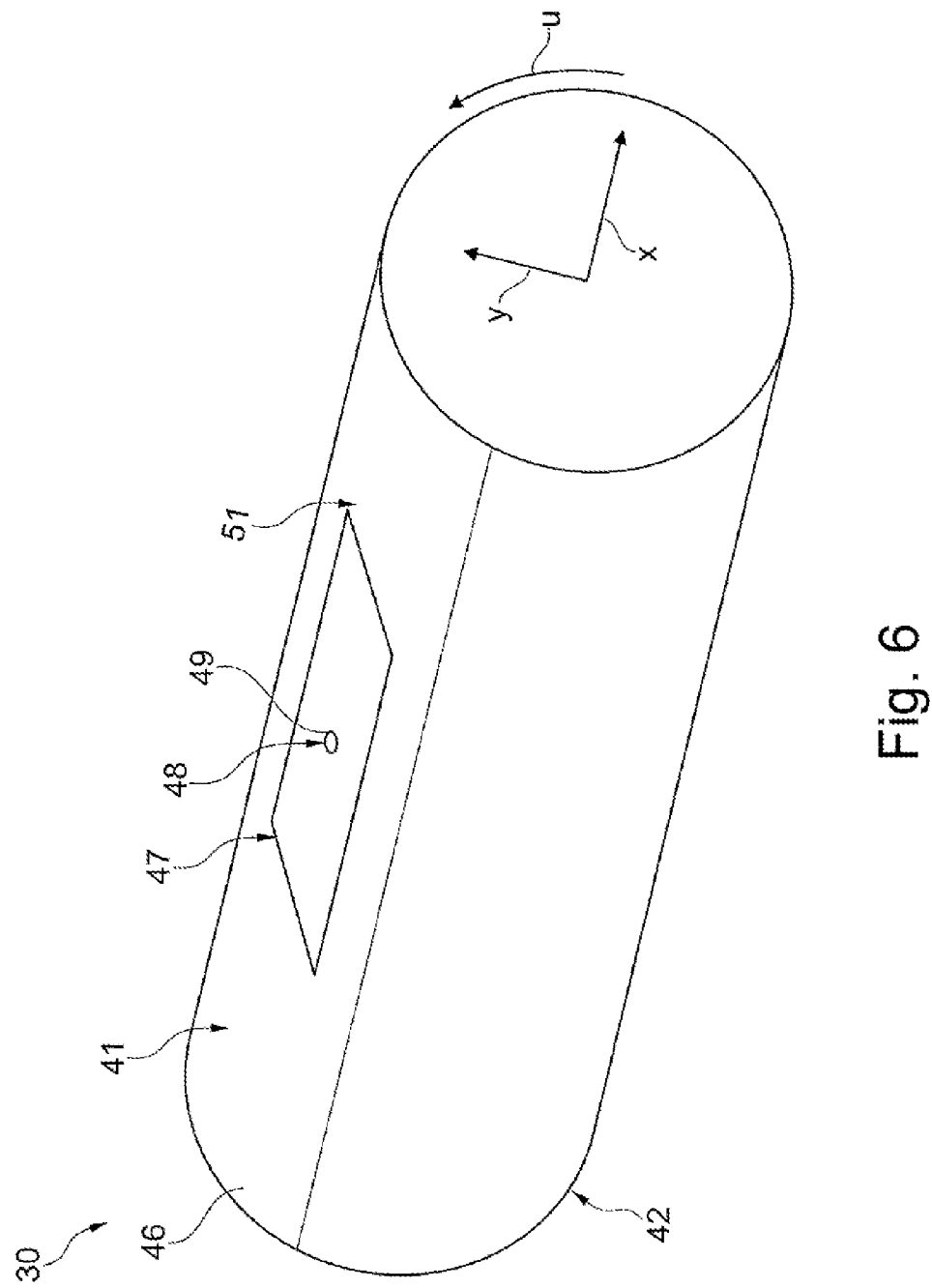
FIG. 6 shows a highly simplified three-dimensional isolated illustration of a planet pin of the planetary gearbox according to FIG. 3, having an oil feed pocket into which a line opens.

A highly simplified three-dimensional isolated illustration of a first embodiment of one of the planet pins 42 of the planetary gearbox 30 according to FIG. 3 is shown in FIG. 6 The planet pin 42 in the region of the external side 46 thereof is embodied with an oil feed pocket 47. The planet pins 42 are in each case mounted in the planet carrier 34 so that the oil feed pockets 47 in the circumferential direction U of the planet pin 42 are in any case disposed outside the highly loaded region of the friction bearing 41. The oil feed pocket 47 here is embodied as a machined recess or cut-out on the external side 46 of the planet pin 42.

One line 48, of which the port region 49 is disposed so as to be in the center of the friction bearing 41 in the axial direction X of the friction bearing 41, opens into the oil feed pocket 47. Additionally, the port region 49 in the circumferential direction U and in the axial direction X is disposed so as to be centric in the oil feed pocket 47, the latter here being embodied so as to be substantially rectangular. The oil feed pocket 47 in the axial direction X of the friction bearing 41 here extends across a larger region of the external side 46 of the planet pin 42 than in the circumferential direction U.

Presently, the oil feed pocket 47 is provided in the region of the radially outer point 45 of the planet pin 42 and hence also of the friction bearing 41. In this way, in the circumferential direction U of the planet pin 42, the oil feed pocket 47 is disposed in a region of the friction bearing 41 which is subject to low loads. As a result, it is guaranteed the oil fed into the oil feed pocket 47 by way of the line 48 enters a bearing clearance 51 of the friction bearing 41 in the desired manner during the rotation of the planet gear 32.

Figure 7:
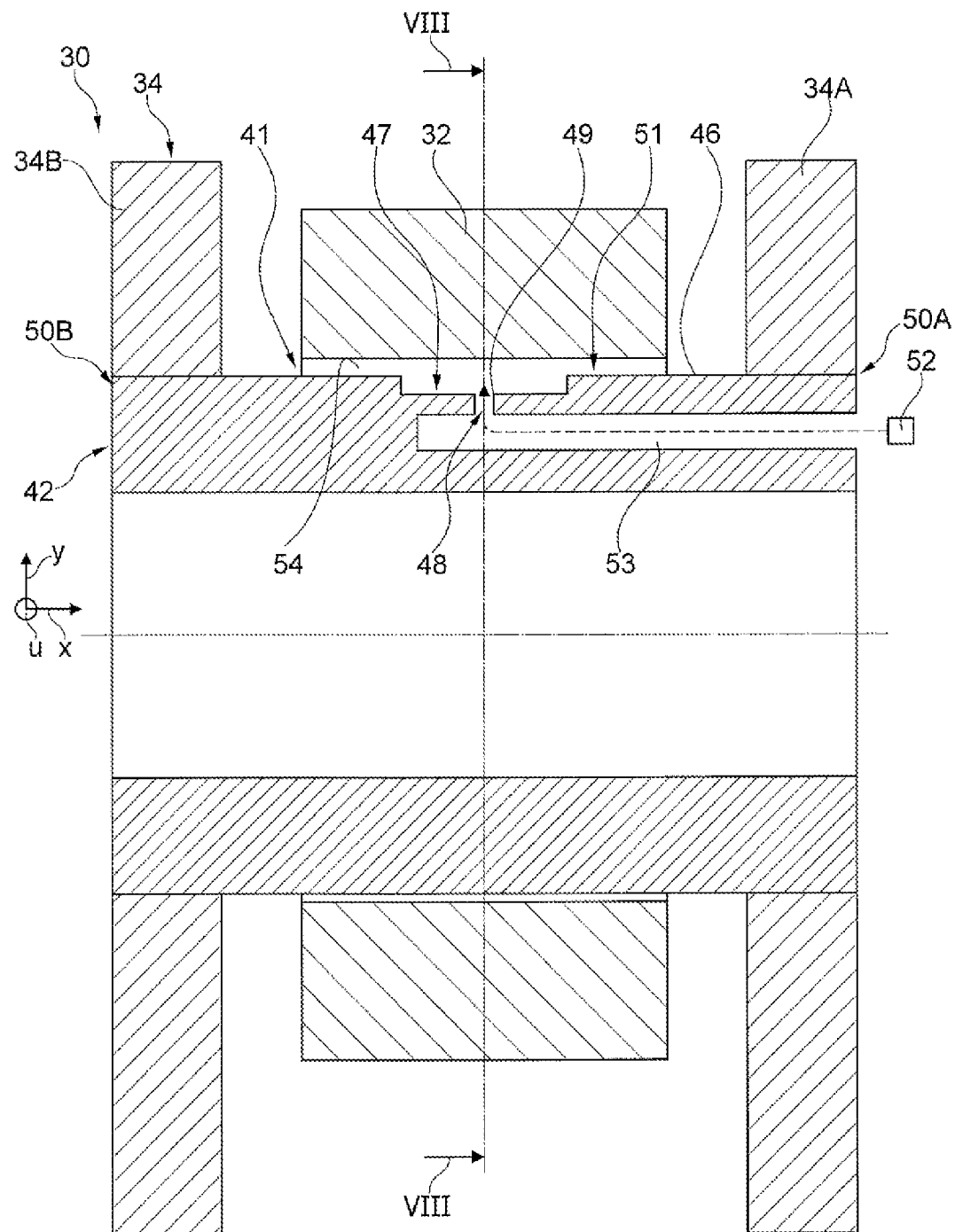
FIG. 7 shows a sectional view of an embodiment of the planetary gearbox along a section line VII-VII denoted more specifically in FIG. 3.

Depending on the respective specific application, the highly loaded region of the friction bearing 41 may be present in a circumferential region of the friction bearing 41 that, conjointly with the radial direction Y of the planet carrier 34 in the rotation direction 44 of the planet gear 42, this corresponding to the main rotation direction of the planet gear 32, encloses angular values phi in a range from 120° to 225°, preferably from 120° to 200°. The oil feed pocket 47 can be disposed outside a circumferential region of the friction bearing 41 that, conjointly with the radial direction Y of the planet carrier 34 in the rotation direction 44 of the planet gear 32, encloses angular values phi in a range from 90° to 190°, preferably from 30° to 210°. It is guaranteed as a result that the oil feed pocket 47 is disposed outside a highly loaded region of the friction bearing 41 and that oil is able to be introduced into the bearing clearance 51 between the planet gear 32 and the planet gear 42 with little complexity FIG. 7 shows a sectional view of an embodiment of the planetary gearbox 30 along a section line VII-VII which is denoted more specifically in FIG. 3 and is configured having the planet pin 42 embodied according to FIG. 6. The planet carrier gear 34 of the planetary gearbox 30 comprises two side plates 34A and 34B spaced apart in the axial direction X. The planet pin 42 is disposed non-rotatably at the ends in respective holes 50A and 50B in the side plates 34A and 34B of the planet carrier 34.

Additionally, FIG. 8 to FIG. 12 show in each case a cross-section view of different embodiments of the planetary gearbox 30 along a section line VIII-VIII which is denoted more specifically in FIG. 7 and of which the planet pin 42 is in each case configured to the extent described in the context of FIG. 6 and which each differ substantially only in the region of the line 48.

Pressurized oil from an oil supply unit 52 is directed into a supply line 53 which runs substantially in the axial direction in the planet pin 42 and is connected to the line 48. The supply line 53 here is embodied as a blind bore.

The oil supply unit 52 and a flow cross section of the line 53, as well as a flow cross section of the line 48, are specified or mutually adapted in such a manner that, during operation of the planetary gearbox 30, a ratio between the impulse by way of which the oil from the line 48 is directed into the bearing clearance 51 and the impulse of the oil which adheres to the internal side 54 of the planet gear 32 is at least $5 \times 10^{-3}$. The impulse of the oil directed in here corresponds to the product of the square of the inflow rate of the oil into the oil feed pocket 47, preferably in the port region 49 of the line 48, and the density of this oil. Moreover, the impulse of the oil that adheres to the internal side 54 of the planet gear 32 corresponds to the product of the square of the velocity of the oil adhering to the second component, or on the planet gear 32, respectively, and the density of the oil. The velocity of the adhering oil here is substantially equal to the rotating speed of the internal side 54 of the planet gear 32.

The fed oil, or lubricant, respectively, is pressurized outside the bearing clearance 51, in the region of the oil supply unit 52, and thereafter, by means of a correspondingly small flow cross section, intensely accelerated in the region of the line 48, or in the port region 49, i.e. in the inlet to the oil feed pocket 47. In the region of the oil feed pocket 47, the accelerated oil meets hot dragged lubricant as well as the hot, rotating shell of the friction bearing 41, this presently being the internal side 54 of the planet gear 32. It is achieved as a result that the dragged lubricant, or oil, respectively is displaced laterally out of the bearing clearance 51 and squeezed out of the bearing clearance 51. This leads to the cold fed oil primarily remaining in the axial center of the friction bearing 41 and being dragged into the tightest lubrication clearance, or into the highly loaded region of the friction bearing 41, respectively, in which the radial height of the bearing clearance 51 is smallest.

Figure 8:
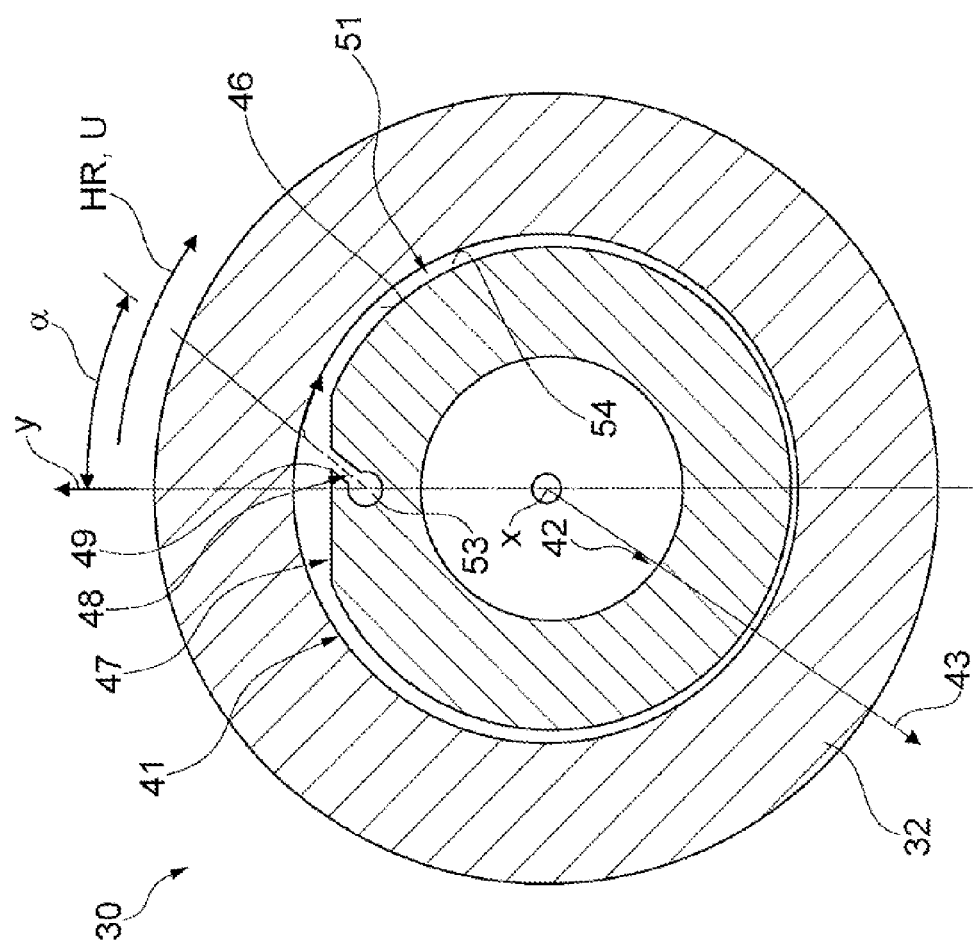
FIG. 8 shows a sectional view of a first variant of the embodiment of the planetary gearbox shown in FIG. 7, along a section line VIII-VIII denoted more specifically in FIG. 7.

In the embodiment of the planetary gearbox 30 shown in FIG. 8, the profile of the line 48, conjointly with the axial direction X of the bearing clearance 51, encloses an angle α. The angle α here varies as a function of the respective specific application, so as to make available an ideally high cooling performance in the region of the friction bearing 41.

The angle α here is provided in such a manner that the oil from the line 48, as a function of the respective specific application, is guided into the bearing clearance 51 and in the direction of the internal side 54 of the planet gear 32 at angles α of approximately 5° to 60° in relation to the radial direction Y of the bearing clearance 51 and in the main rotation direction of the planet gear 32, which is denoted more specifically by the arrow HR in FIG. 8. Positive cooling of the highly loaded region of the friction bearing 41, and thus an improved load bearing capability of the friction bearing 41, are achieved as a result.

Figure 9:
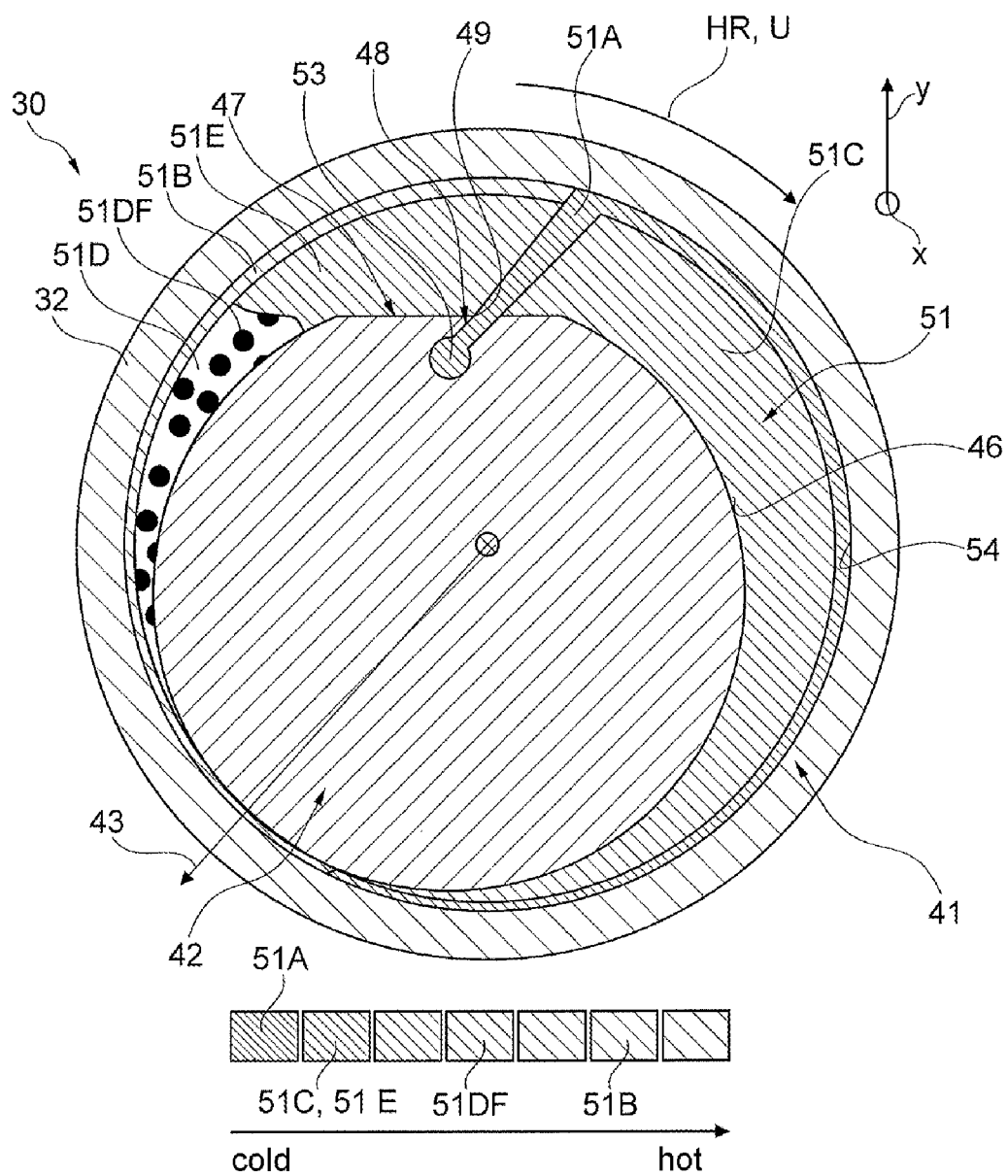
FIG. 9 shows an illustration, corresponding to that of FIG. 8, of the first variant of the planetary gearbox according to FIG. 8, having temperature zones of the oil introduced into the bearing clearance that run in the circumferential direction in the bearing clearance of the friction bearing.

FIG. 9 shows an illustration, corresponding to that of FIG. 8, of the embodiment of the planetary gearbox 30 according to FIG. 8, wherein a height of the bearing clearance 51 in the circumferential direction U in FIG. 9 is not illustrated true to scale. Additionally, FIG. 9 shows different temperature zones 51A to 51E of the lubricant, or of the oil, respectively, in the bearing clearance, said temperature zones 51A to 51E extending in the radial direction Y as well as in the circumferential direction U. Moreover, the friction bearing 41 in the axial direction X of the friction bearing 41 also has a temperature profile across the bearing width, said temperature profile to be discussed in more detail later in the description pertaining to FIG. 21.

The temperature zone 51A of the bearing clearance 51 is characterized by the lowest temperature of the oil in the bearing clearance 51. The temperature zone 51A here, from the port region 49 of the line 48, initially extends obliquely through the bearing clearance 51 in the direction of the internal side 54 of the planet gear 32. This first region of the temperature zone 51A is created by the oil jet which exits the port region 49 of the line 48 at the angle α. Where the oil jet impacts the internal side 54 of the planet gear 32, dragged oil is cooled by the oil being directed into the bearing clearance 51. A temperature zone 51B of the bearing clearance 51 in which the highest operating temperature of the oil is present, this being equal to the temperature of the oil which in the bearing clearance 51 is dragged from the tightest bearing clearance in the circumferential direction U, terminates in the circumferential direction U ahead of that region where the oil directed in impacts the internal side 54 of the planet gear.

By virtue of the oil directed into the bearing clearance 51 by way of the corresponding impulse, the cool fresh oil keeps adhering to the internal side 54 of the planet gear 32, and in the circumferential direction U is dragged from the planet gear 32 in the direction of the highly loaded region of the friction bearing 41 on the external circumference of the bearing clearance 51. A third temperature zone 51C is formed between the zone 51A and the external side 46 of the planet pin 42, the oil in the region of said third temperature zone 51C having a somewhat higher temperature than in the zone 51A. The zone 51C, from the oil jet, or from the region of the zone 51A that penetrates the bearing clearance 51 at the angle α, extends to the highly loaded region of the friction bearing 41, which here is present about the main load direction 43. The oil in the highly loaded zone, in which the radial height of the bearing clearance 51 is the smallest, is heated by virtue of the shear load. Upstream of the highly loaded region of the friction bearing 41, the clearance height of the bearing clearance 51 steadily converges up to the highly loaded region from the oil feed pocket 47.

In a circumferential region of the bearing clearance 51, which follows the highly loaded region of the friction bearing 41 in the circumferential direction U, or in the main rotation direction HR of the planet gear 32, respectively, the clearance height of the bearing clearance 51 diverges, or the radial clearance height of the bearing clearance 51 steadily increases again in the direction of the oil feed pocket 47, respectively. Upon leaving the highly loaded region of the friction bearing 41, by virtue of the centrifugal force that engages on the oil during the operation, oil adheres to the internal side 54 of the planet gear 32 to the same degree as the fresh oil previously directed into the bearing clearance 51 and is entrained in the circumferential direction U, or in the main rotation direction HR of the planet gear 32, respectively, in the direction of the oil feed pocket 47. A further temperature zone 51D of the bearing clearance 51, within which the bearing clearance 51 is not completely filled with oil, is present between the temperature zone 51B and the external side 46 of the planet pin 42. The regions of the temperature zone 51D in which oil is present in the form of oil droplets are denoted more specifically by the reference sign 51DF in FIG. 9. The lubricant regions 51DF of the zone 51D have an insignificantly lower operating temperature than the dragged oil in the temperature zone 51B.

Additionally, in the main rotation direction HR of the planet gear 32 and radially within the zone 51B, a further zone 51E is established between the zone 51D and the zone 51A, said further zone 51E being completely filled with oil and the oil in the region of said further zone 51E having an operating temperature which corresponds substantially to the operating temperature of the oil in the zone 51C. The operating temperature of the lubricant in the zone 51E, which is lower in comparison to those in the zones 51B and the lubricant regions 51DF of the zone 51D, is again established by virtue of the volumetric flow of oil directed from the line 48 into the bearing clearance 41.

The temperature profile of the lubricant, or of the oil, respectively, present as a result of the different temperature zones 51A to 51E in the circumferential direction of the friction bearing 41, has a positive effect on the load bearing capability of the friction bearing 41. This results from the fact that improved cooling and an improved displacement of the dragged warm oil in the zone 51B is achieved on account of the oil being fed by way of the correspondingly strong impulse and the oil being directed in obliquely in relation to the radial direction Y and in the main rotation direction HR of the planet gear 32 in relation to the planet pin 42.

Figure 10:
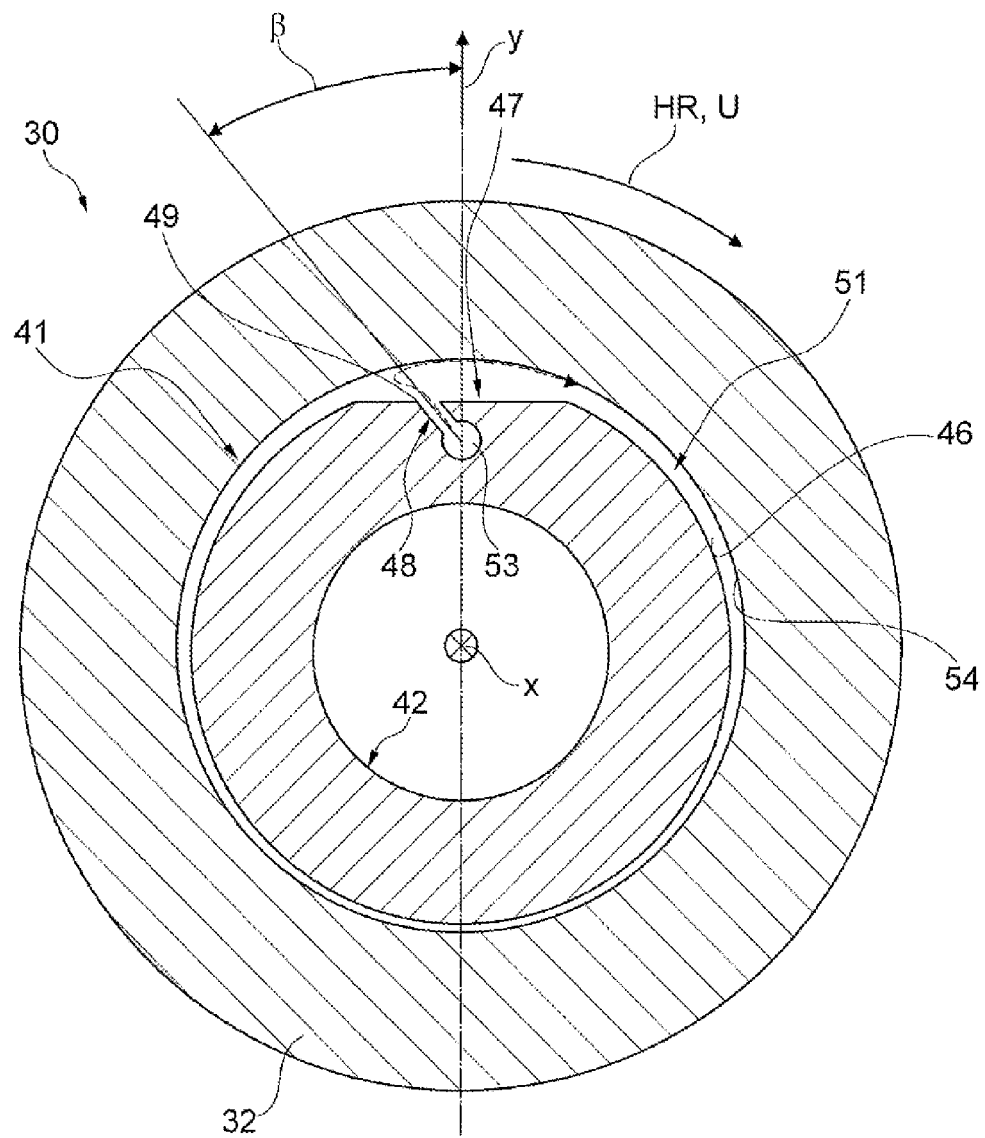
FIG. 10 shows an illustration, corresponding to that of FIG. 8, of a second variant of the embodiment of the planetary gearbox shown in FIG. 7, along the section line VIII-VIII denoted more specifically in FIG. 7.

FIG. 10 shows an illustration, corresponding to that of FIG. 8, of a further exemplary embodiment of the planetary gearbox 30, in which the line 48, conjointly with the radial direction Y of the planetary gearbox 30, encloses an angle β which as a function of the respective specific application, or specific load, respectively, is conceived for positive cooling and a positive displacement of dragged warm oil from the bearing clearance 51 of the friction bearing 41. In principle, the angle β is chosen so that the discharge direction of the oil from the line 48, conjointly with the radial direction Y of the bearing clearance 51 and counter to the main rotation direction HR of the planet gear 32 in relation to the planet pin 42, encloses an angle β of approximately 5° to 20°.

Figure 11:
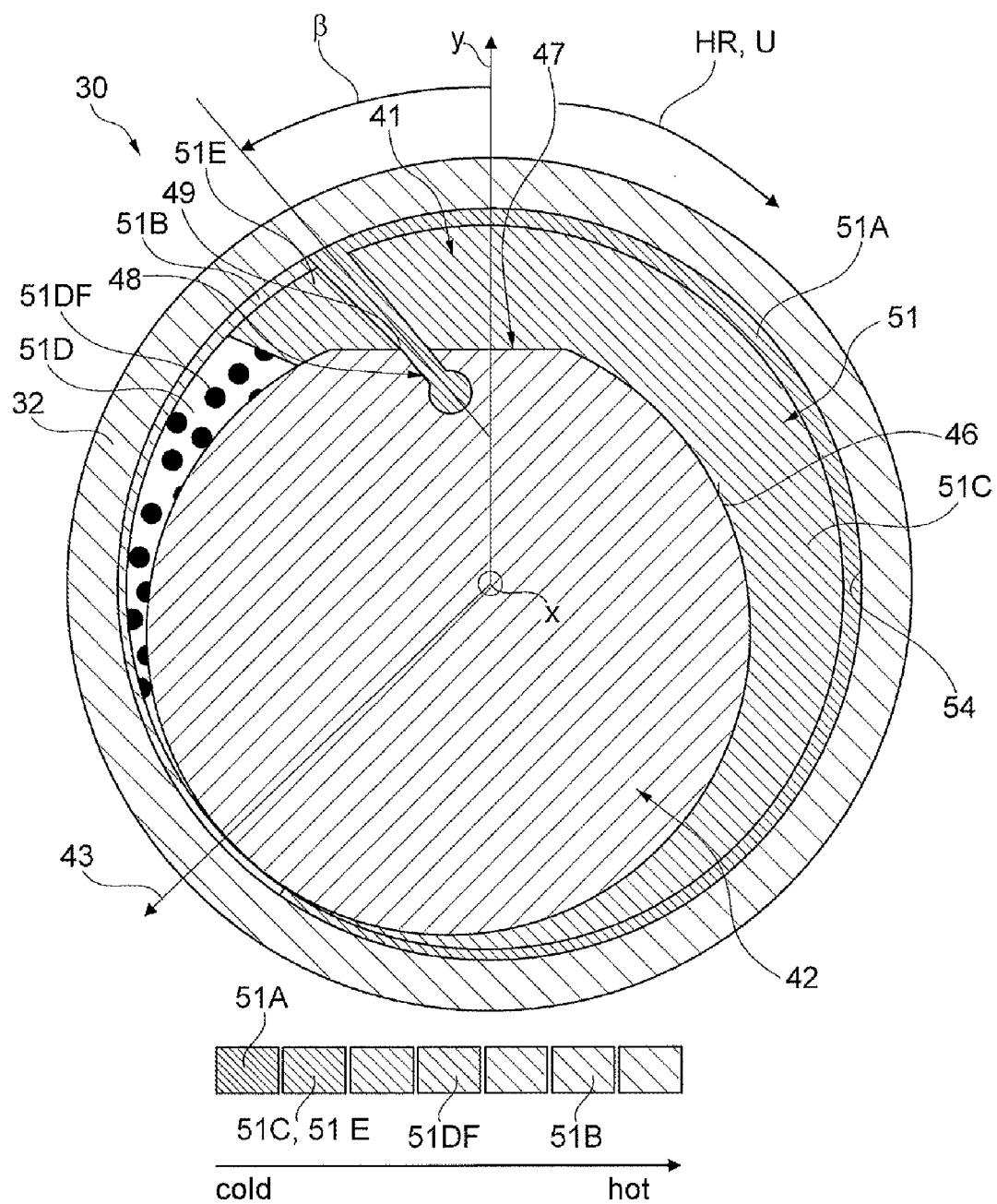
FIG. 11 shows an illustration, corresponding to that of FIG. 9, of the second variant of the planetary gearbox according to FIG. 10, having temperature zones of the oil that run in the circumferential direction of the bearing clearance of the friction bearing.

FIG. 11 shows an illustration, corresponding to that of FIG. 9, having the temperature zones 51A to 51E in the bearing clearance 51, said temperature zones 51A to 51E being established by virtue of the oblique introduction, described in relation to FIG. 10, of the oil from the line 48 into the bearing clearance 51. It is derived from a comparison of the illustrations according to FIG. 9 and FIG. 11 that the temperature zones 51A and 51C in the planetary gearbox 30 according to FIG. 10 extend across a larger circumferential region of the friction bearing 41, or of the bearing clearance 51, respectively, than the temperature zones 51A and 51C of the bearing clearance 51 of the planetary gearbox 30 according to FIG. 9. In the embodiment of the planetary gearbox 30 according to FIG. 10, the temperature zone 51E in the circumferential direction U simultaneously extends across a smaller angular range, or circumferential region, respectively, of the bearing clearance 51 than the temperature zone 51E of the friction bearing 41 according to FIG. 8 or FIG. 9, respectively.

Figure 12:
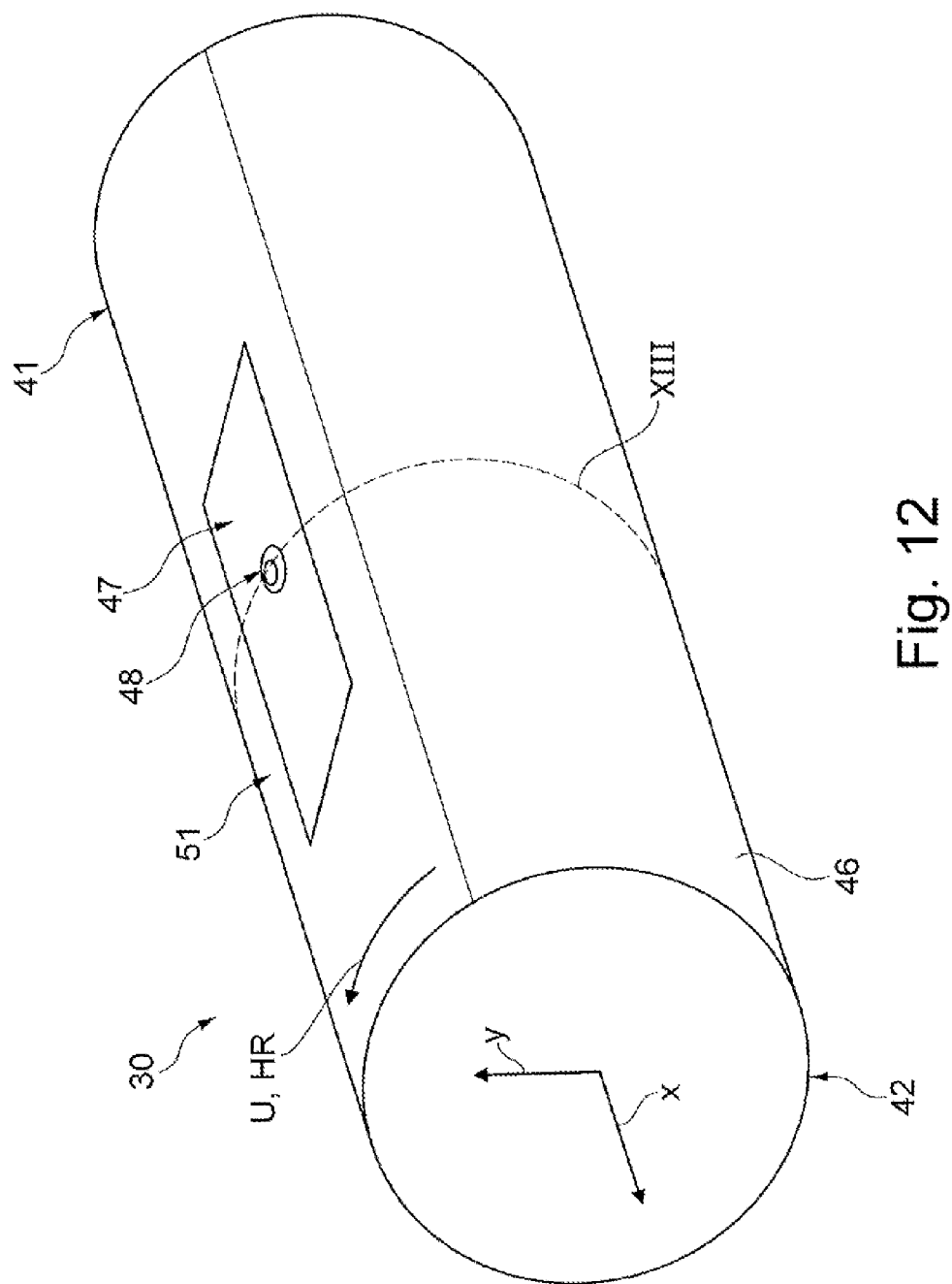
FIG. 12 shows an illustration, corresponding to that of FIG. 6, of a planet pin of a further embodiment of the planetary gearbox according to FIG. 3.

FIG. 12 shows a highly schematic three-dimensional illustration of the planet pin 42 of further embodiments of the planetary gearbox 30. The planet pin 42 is embodied with the oil feed pocket 47 and the line 48. The line 48 here, to the degree described in more detail in the context of FIG. 13 to FIG. 19, comprises two line portions 48A, 48B which adjoin one another in the feed direction Z14 or Z16, respectively, of the oil into the oil feed pocket 47. The flow cross section of the first line portion 48A, which is connected directly to the supply line 53, is smaller than the flow cross section of the second line portion 48B, which opens into the oil feed pocket 47.

The flow cross sections of the two line portions 48A and 48B are mutually disposed so as to be offset in the circumferential direction U, or in the main rotation direction HR of the planet gear 32, respectively. In the exemplary embodiment illustrated in more detail in FIG. 13, FIG. 14 and FIG.

18, the flow cross section of the line 48 for the oil, proceeding from the first line portion 48A in the direction of the second line portion 48B, here increases more in the circumferential direction U of the bearing clearance 51 and counter to the main rotation direction HR of the second component, or of the planet gear 32, respectively, than in the main rotation direction HR of the planet gear 32.

Figure 15:
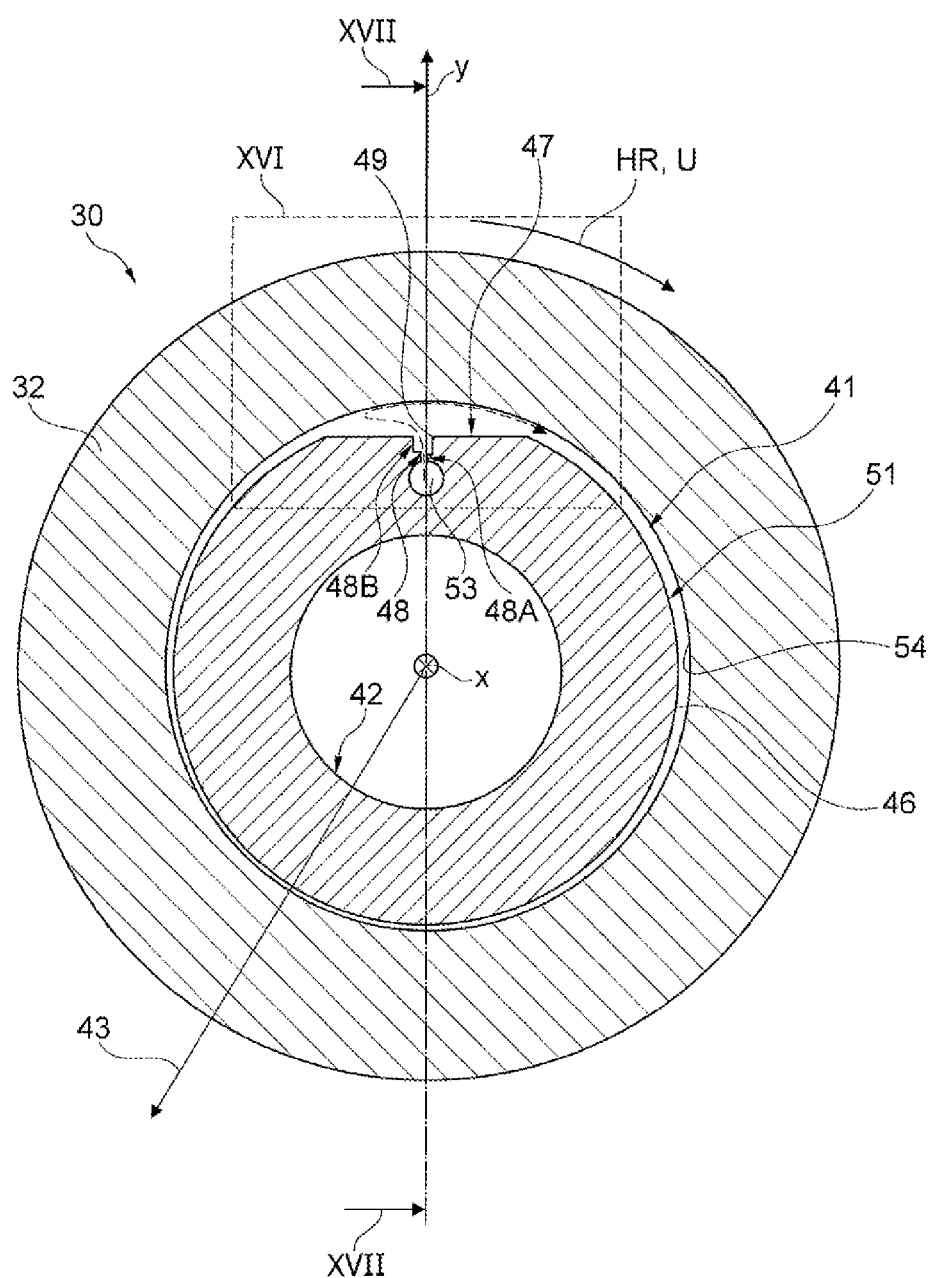
FIG. 15 shows an illustration, corresponding to that of FIG. 13, of a further variant of the planetary gearbox box according to FIG. 12.
Figure 16:
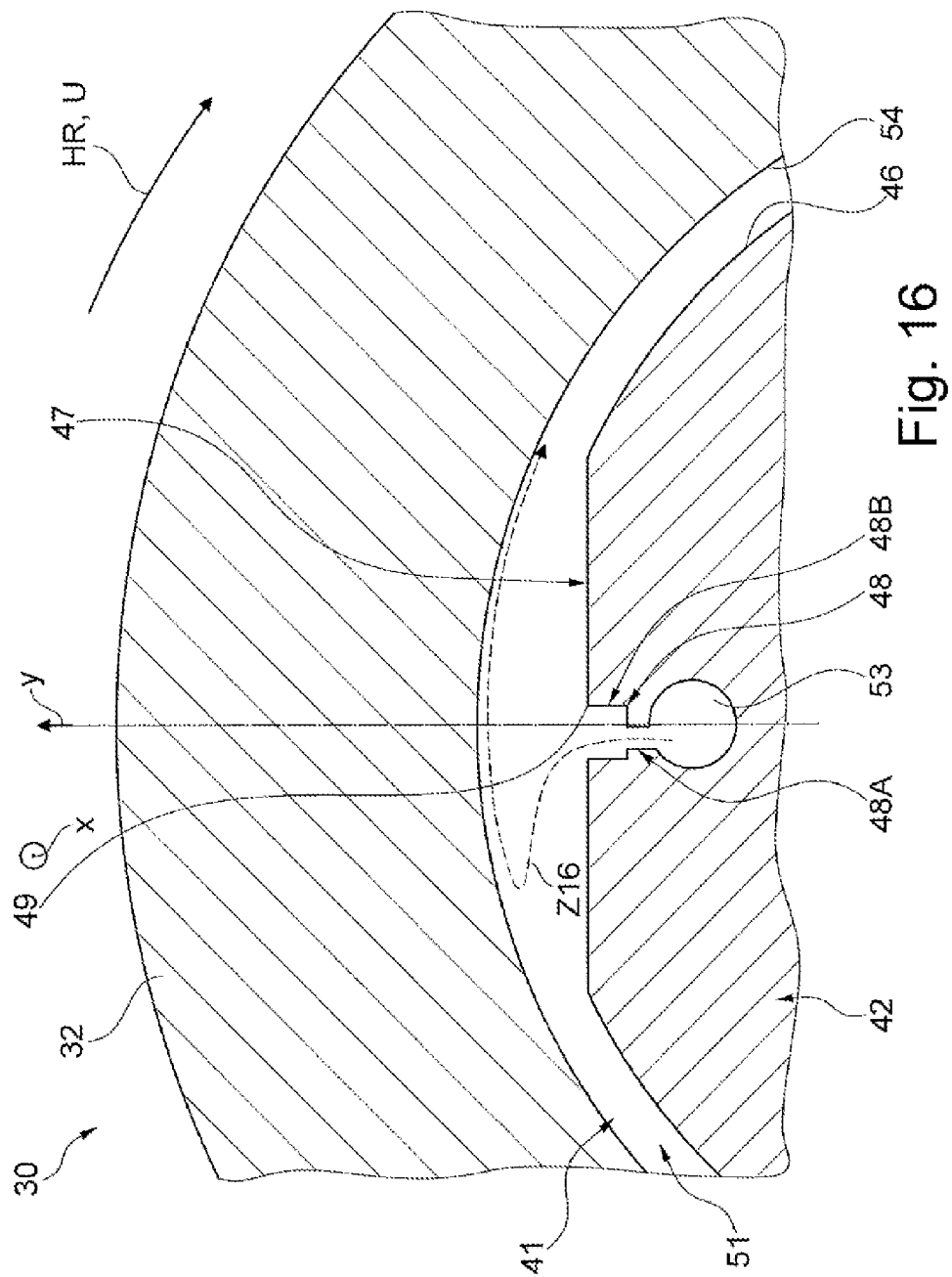
FIG. 16 shows an enlarged illustration of a region XVI of the planetary gearbox denoted more specifically in FIG. 15.
Figure 19:
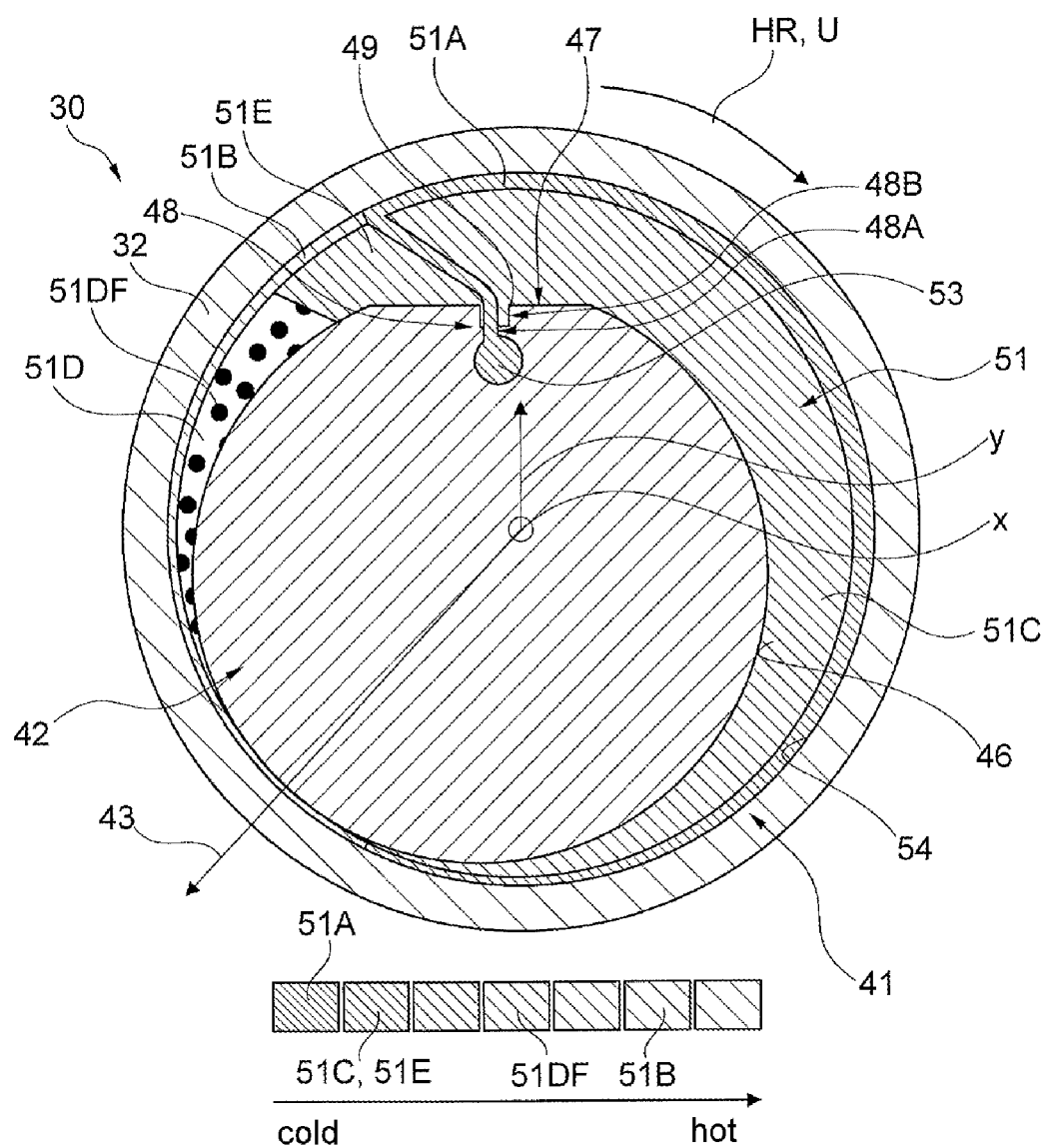
FIG. 19 shows an illustration, corresponding to that of FIG. 18, of the fourth variant of the planetary gearbox according to FIG. 15, having temperature zones of the oil present in the bearing clearance that run in the circumferential direction.

As opposed thereto, in the exemplary embodiment of the planetary gearbox 30 illustrated in FIG. 15, FIG. 16 and FIG. 19, the flow cross section of the line 48 for the oil, proceeding from the first line portion 48A in the direction of the second line portion 48B, increases more in the circumferential direction U of the bearing clearance 51 and in the main direction HR of the planet gear 32 in relation to the friction bearing 41 than counter to the main rotation direction HR of the planet gear 32.

The eccentric arrangement of the line regions 48A and 48B of the line 48 according to FIG. 12, which causes the jet of the volumetric flow of oil to be guided eccentrically in the line 48, in relation to the radial direction X deflects the volumetric flow of oil in the rotation direction HR of the planet gear 32 and in the direction of the internal side 54 of the planet gear 32. The deflection of the volumetric flow of oil in the rotation direction, or in the main rotation direction HR of the planet gear 32, respectively, exploits the so-called Coandă effect. As a result, the freshly supplied lubricant, or oil, respectively, is transported in the direction of the tightest lubrication clearance, or the main load zone of the friction bearing 41, respectively, so as to be more centric in the friction bearing 41. Since the supporting region arises primarily in the axial center of the friction bearing 41, the fresh lubricant can act in a more targeted manner here. FIG. 14 in an enlarged illustration shows a region XIV, indicated more specifically in FIG. 13, and the eccentric mutual arrangement of the two line portions 48A and 48B, as well as the feed direction Z14 of the oil from the line 48 into the bearing clearance 51.

FIG. 15 and FIG. 16 show the eccentric arrangement of the two line regions 48A and 48B in the rotation direction HR of the planet gear 32, said eccentric arrangement, by virtue of the Coandă effect likewise acting as a result, according to the feed direction Z16 causing an oblique discharge of the volumetric flow of oil from the line 48 counter to the rotation direction HR and in the direction of the internal side 54 of the planet gear 32.

Figure 13:
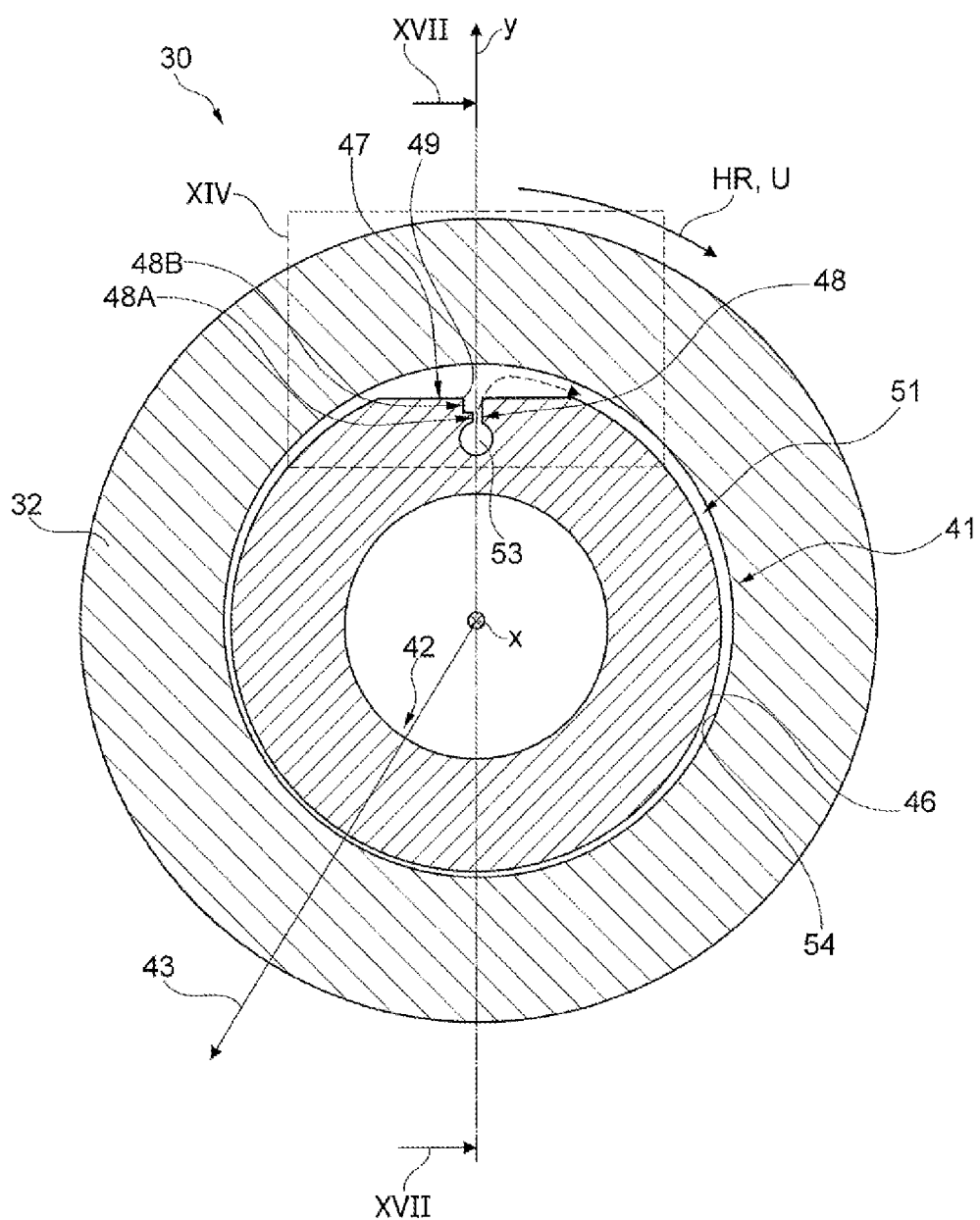
FIG. 13 shows a sectional view of a variant of the planetary gearbox shown in FIG. 12, along a section line XIII-XIII denoted more specifically in FIG. 12.
Figure 14:
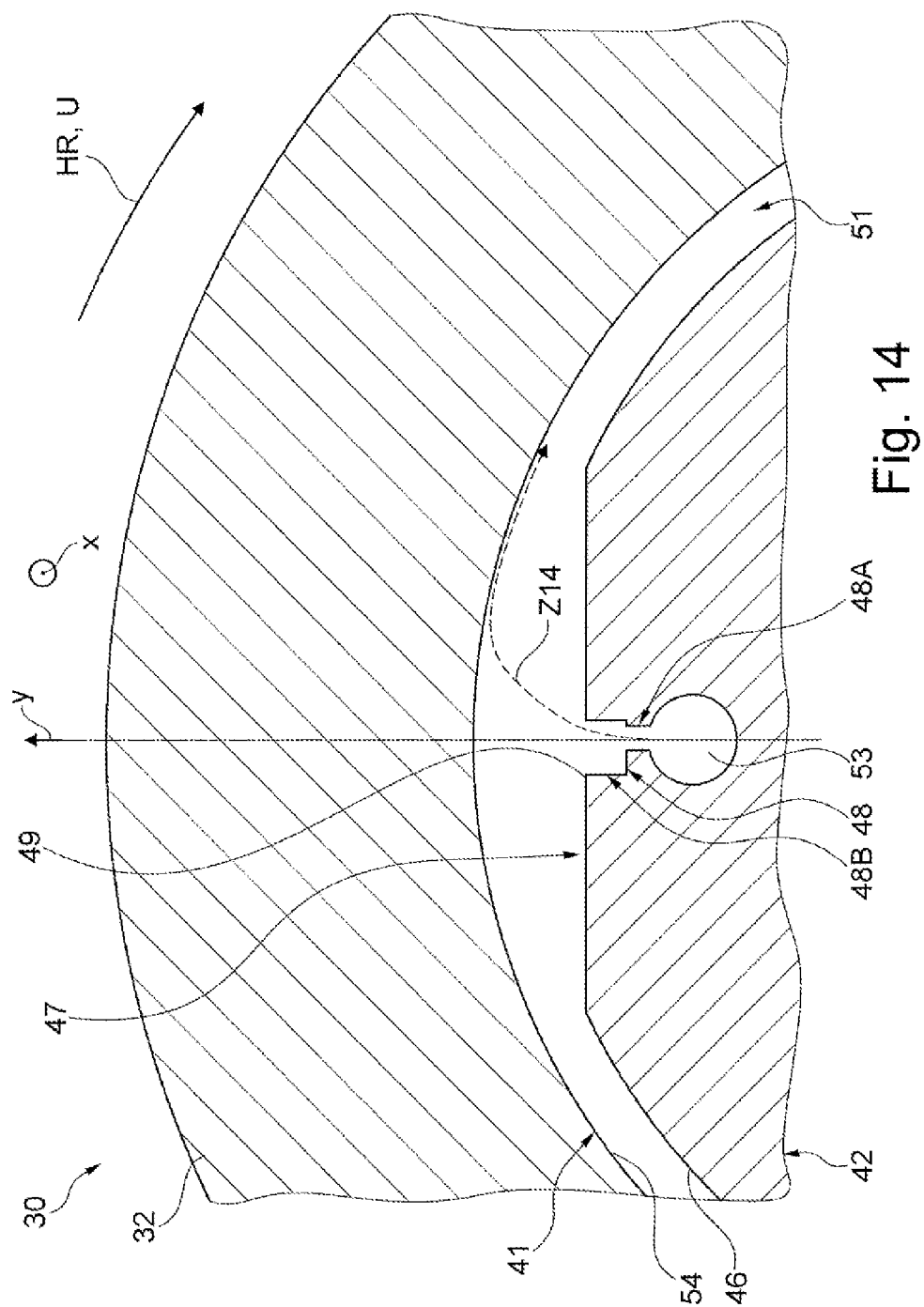
FIG. 14 shows an enlarged view of a region XIV, indicated more specifically in FIG. 13.
Figure 17:
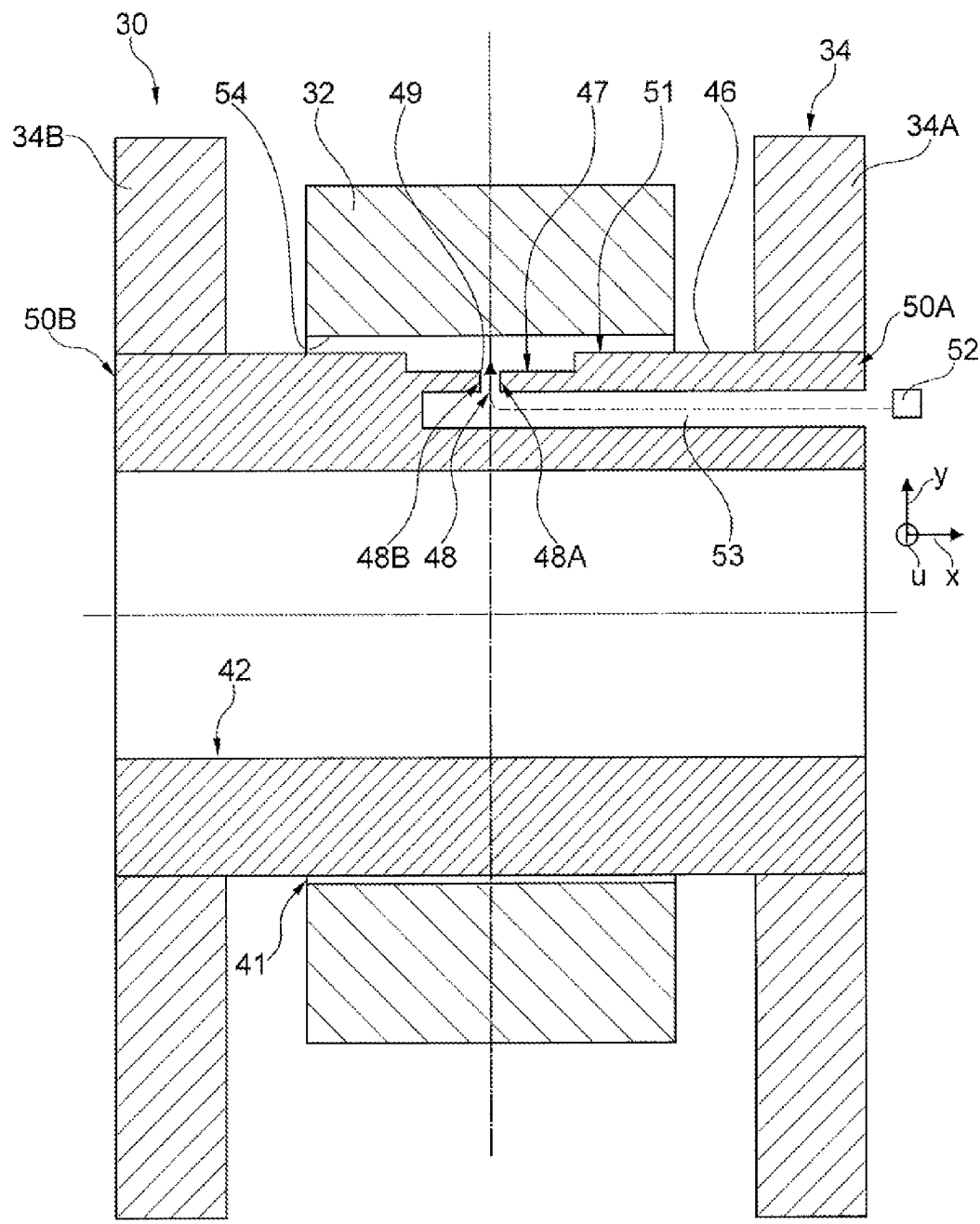
FIG. 17 shows a longitudinal sectional view of the third variant of the planetary gearbox shown in FIG. 13, as well as of the fourth variant of the planetary gearbox illustrated in FIG. 15, along a section line XVII-XVII denoted more specifically in each of FIG. 13 and FIG. 15.

FIG. 17 shows a longitudinal sectional view of the variants of the planetary gearbox 30 shown in FIGS. 13 and 15, along a section line XVII-XVII denoted more specifically in each of FIG. 13 and FIG. 15.

Figure 18:
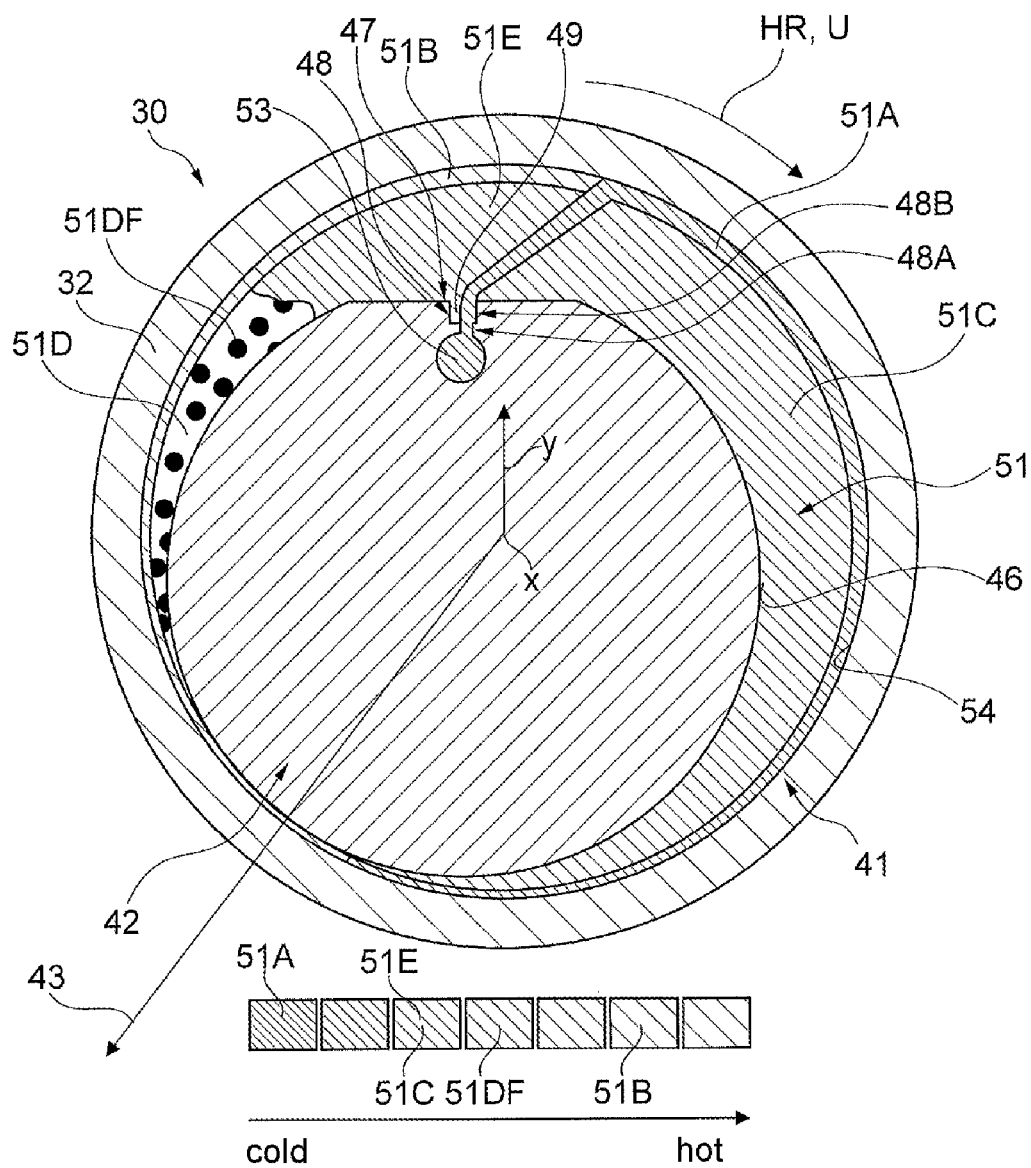
FIG. 18 shows an illustration, corresponding to that of FIG. 9, of the third variant of the planetary gearbox according to FIG. 13, having temperature zones of the oil present in the bearing clearance that run in the circumferential direction of the friction bearing.

FIGS. 18 and 19 each show an illustration, corresponding to that of FIG. 9, of the embodiments of the planetary gearbox 30 according to FIG. 13 or FIG. 15, respectively. The oblique introduction of the volumetric flow of oil into the bearing clearance 51 in relation to the radial direction Y of the planetary gearbox 30, or of the friction bearing 41, respectively, again leads to the different lubricant zones, or temperature zones 51A to 51E, respectively, being established in the bearing clearance 51 in circumferential direction U and in the rotation direction HR of the planet gear 42.

It is derived from a comparison of the illustration according to FIG. 9 or FIG. 11, respectively, and the illustrations according to FIG. 18 or FIG. 19, respectively, that an obliquely running line 48 as well as the eccentric mutual arrangement of the line portions 48A and 48B, in conjunction with a correspondingly strong impulse ratio of the oil, has the effect of improving the load bearing capability of the friction bearing 41 in comparison to known friction bearing embodiments.

In further embodiments of the planetary gearbox 30 it can also be provided that at least one of the lines 48, 55, or 48, 55, 57, or 67 to 70, respectively, is embodied with line portions that are embodied so as to be mutually eccentric, as well as with a profile that is oblique in relation to the radial direction Y.

Figure 20:
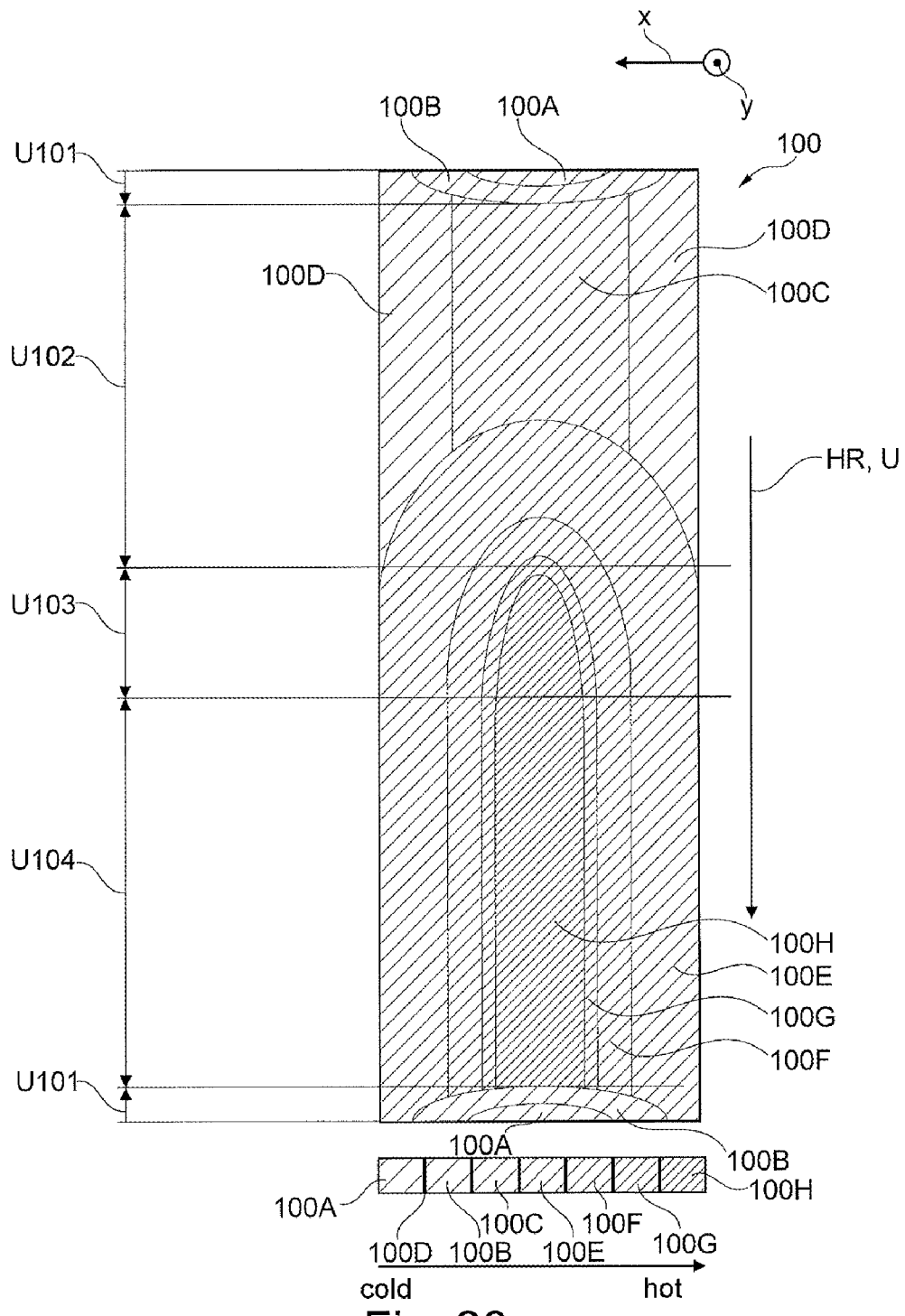
FIG. 20 shows a developed view of the bearing clearance of a friction bearing impinged with oil, said friction bearing being known in practice and having temperature zones that extend in the circumferential direction and in the axial direction of the friction bearing.

FIG. 20 shows a developed view of a bearing clearance 100 of a conventionally embodied friction bearing, in which oil in the region of an oil feed pocket is directed into the bearing clearance substantially in the radial direction Y and by way of an insufficient impulse ratio. In the operation, different temperature zones 100A to 100H are established in the circumferential direction U and in the rotation direction, or in the main rotation direction HR of the rotatable component of the friction bearing, respectively, in the bearing clearance 100. The temperature zones 100A to 100H are established by virtue of the insufficient supply of lubricant into the bearing clearance 100. Moreover, a temperature scale for the temperature zones 100A to 100H is indicated below the illustration of the developed view of the bearing clearance in FIG. 20. The temperature in the zone 100A is the lowest and corresponds substantially to the temperature at which the oil is fed into the bearing clearance 100. Moreover, the temperature in the temperature zone 100H of the lubricant is the highest and corresponds substantially to the temperature in the bearing clearance 100 in the tightest lubrication clearance, or to the temperature of the dragged oil, respectively.

A circumferential region U101 of the bearing clearance 100 presently comprises the region of the bearing clearance in which the oil feed pocket of the friction bearing is provided and in which mixing takes place between the oil dragged into the bearing clearance 100 and the fed cool oil. A second circumferential region U102 of the bearing clearance 100, in which the bearing clearance, or the height of the latter in the rotation direction of the rotatable component of the friction bearing, respectively converges and further mixing of the hot dragged lubricant and the cold fed lubricant takes place, adjoins the circumferential region U101. A temperature zone 100C, which is central in the axial direction X of the friction bearing, is disposed between two axially outer temperature zones 100D in the circumferential region U102, wherein the temperature in the temperature zone 100C is higher than in the lateral temperature zones 100D of the bearing clearance 100.

By virtue of the decreasing clearance height of the bearing clearance 100, the temperature in the bearing clearance 100 increases already in the circumferential region U102, which is why the temperature in a further temperature zone 100E, embodied so as to be at least approximately arcuate, is higher than in the temperature zones 100C and 100D. From the circumferential region U102, the temperature zone 100E extends across the further circumferential regions U103, U104 into the circumferential region U101. Further temperature zones 100F, 100G and the centric temperature zone 100H are provided in the circumferential direction U, or in the rotation direction HR of the rotatable component, as well as in the axial direction X, or in the direction of the bearing center of the friction bearing, or of the bearing clearance 100, respectively, within the temperature zone 100E. The temperature of the oil here increases in each case from the temperature zone 100E in the direction of the temperature zone 100H.

The circumferential region U103 comprises the area, or the circumferential region, respectively, of the bearing clearance 100 in which the tightest lubrication clearance, or the smallest lubrication clearance height, respectively, is present and in which significant heating of the lubricant takes places in the bearing clearance 100. The circumferential region U103 is adjoined by the further circumferential region U103 in which the height of the lubrication clearance increases again in the circumferential direction U, or in the main rotation direction HR of the rotatable component, respectively. This region corresponds to the partially filled, diverging clearance region of the bearing clearance 100 described in the context of FIG. 9 and FIG. 11. The temperature zone 100F, disposed between the temperature zone 100E and the inner temperature zone 100H, and also the temperature zone 100G in the circumferential region U104 have a substantially consistent profile, or a substantially consistent width, respectively, in the circumferential direction U as well as in the axial direction X. The temperature profile of the bearing clearance 100 described in the context of FIG. 20, in particular by virtue of the high temperature of the lubricant in the temperature zone 100H, has a disadvantageous effect on the load bearing capability of a friction bearing. Additionally, such a friction bearing has to be fed a high quantity of lubricant in order to avoid undesirably high bearing temperatures.

Figure 21:
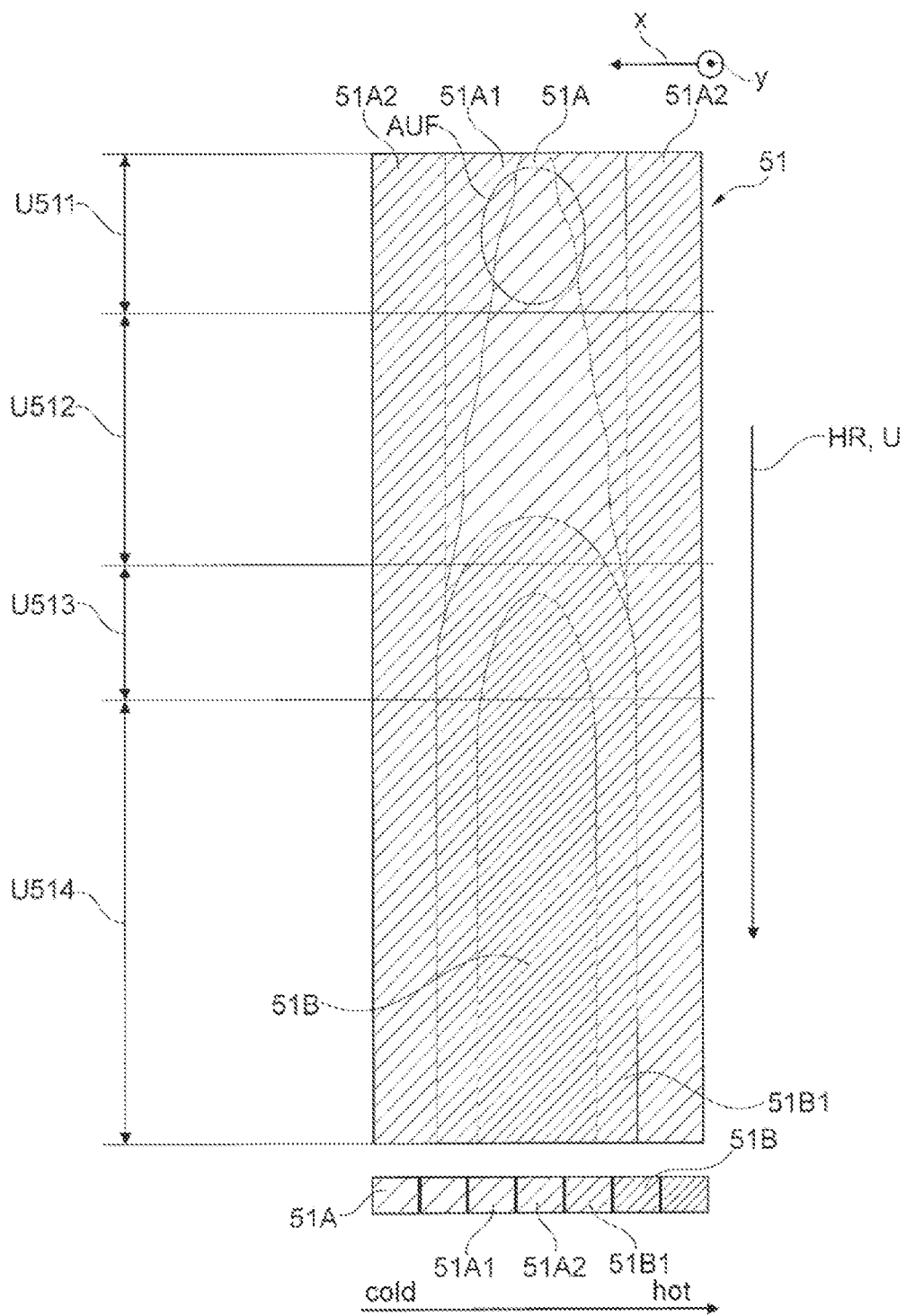
FIG. 21 shows an illustration, corresponding to that of FIG. 20, of the temperature profile in the circumferential direction and in the axial direction of the friction bearing according to the present disclosure, said friction bearing being supplied with oil in a manner corresponding to that of the first variant, the second variant, the third variant or the fourth variant of the planetary gearbox.

FIG. 21 shows an illustration, corresponding to that of FIG. 20, of the bearing clearance 51 of the friction bearing 41 of the planetary gearbox 30, having on the circumference different bearing clearance portions U511 to U512 and different temperature zones 51A to 51B. In principle, the temperature zones 51A and 51B are established in the bearing clearance 51 in all afore-described embodiments of the planetary gearbox 30. The temperature zone 51A here has substantially the same temperature level as the temperature zone 100A of the bearing clearance 100. It is apparent when comparing the two illustrations according to FIG. 21 and FIG. 20 that the cool temperature zone 51A extends across a substantially larger circumferential region of the bearing clearance 51 than is the case in the temperature zone 100A of the bearing clearance 100.

A region AUF, which identifies the impact region of the jet of the volumetric flow of oil from the line 48 on the internal side 54 of the planet gear 32 is denoted in the circumferential region U511 of the bearing clearance 51. It can furthermore be derived from the illustration according to FIG. 21 that the afore-described oil feed into the bearing clearance 51 has the effect of cooling and displacing the dragged oil in the bearing clearance 51 in the desired manner. Additionally, as a result of the impulse-rich oil feed into the bearing clearance 51, directed in each case in the rotation direction or counter to the rotation direction HR of the planet gear 32, an overall reduction of the temperature level in the bearing clearance 51 in the circumferential direction U as well as in the axial direction X is achieved in comparison to the friction bearing of which the temperature profile is shown in FIG. 20.

The outer temperature zones 51A2 here have substantially the same temperature level as the temperature zone 100E in the bearing clearance 100. The improved cooling of the friction bearing 41 manifests itself most significantly in that the inner temperature zone 51B has a lower temperature level than the central temperature zone 100H of the bearing clearance 100. In the exemplary embodiment in focus, the temperature level of the temperature zone 51B corresponds to the temperature level of the temperature zone 100G of the bearing clearance 100. Additionally, the oil in the temperature zone 51B1 has the temperature level of the temperature zone 100F.

The circumferential region U511 of the bearing clearance 51, besides the jet impact region AUF, also comprises a part of the bearing clearance region in the circumferential direction U in which the bearing clearance 51, or the height thereof, respectively, already converges in the direction of the highly loaded region of the friction bearing 41, and in which mixing of the hot dragged lubricant with cold fed lubricant takes place. The mixing of the cold lubricant with the dragged hot lubricant also continues in the circumferential region U512 of the bearing clearance 51, into which the coldest temperature zone 51A extends to the degree illustrated. The circumferential region U512 is adjoined by the circumferential region U513 which corresponds substantially to the circumferential region U103 of the bearing clearance 100 and in the circumferential direction U comprises the area of the bearing clearance 51 in which the tightest lubrication clearance is disposed and in which significant heating of the lubricant takes place. In the main rotation direction HR of the planet gear 32, the circumferential region U513 is adjoined by the circumferential region U514 of the bearing clearance 51, the latter corresponding substantially to the circumferential region U104 of the bearing clearance 100 and the partially filled, diverging clearance region being present therein.

Figure 22:
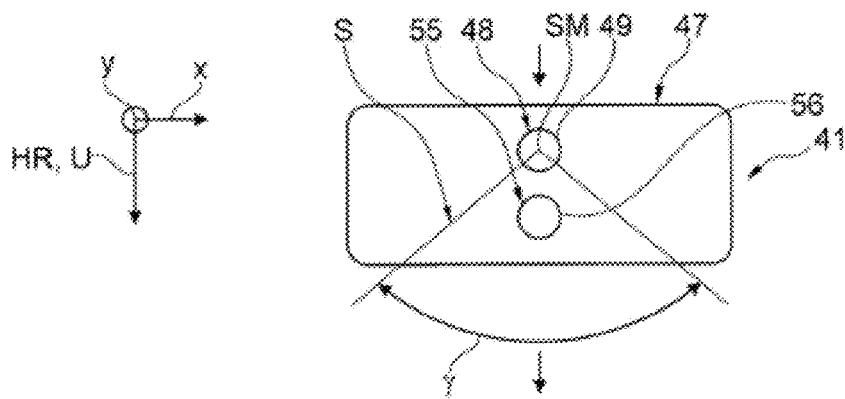
FIG. 22 shows a highly simplified illustration of an oil feed pocket of a further variant of the planetary gearbox according to FIG. 3, having two lines of which the port regions open into the oil feed pocket and which are mutually spaced apart in the circumferential direction and in the main rotation direction of the planet gear in relation to the planet pin and are at the same level in the axial direction of the friction bearing.

FIG. 22 shows a plan view of the oil feed pocket 47 of the friction bearing 41 of a further embodiment of the planetary gearbox 30, in which—besides the line 48—a further line 55 opens into the oil feed pocket 47 and thus into the bearing clearance 51. A port region 56 of the further line 55 in the axial direction X of the friction bearing 41 is disposed on the same circumferential region as the port region 49 of the line 48. In the exemplary embodiment of the planetary gearbox 30 shown in FIG. 22, the lines 48 and 55 open into the oil feed pocket 47 so as to be centric in the axial direction X. The port region 56 is disposed in the oil feed pocket 47 so as to be spaced apart from the port region 49 in the circumferential direction U of the bearing clearance 51 and in the main rotation direction HR of the planet gear 42.

As a result of this mutual arrangement of the two port regions 56 and 49, a temperature profile which corresponds substantially to the temperature profile described in more detail in the context of FIG. 21 is established in the bearing clearance 51. In order to achieve further improved cooling and lubricating of the friction bearing 41, the lines 48 and 55, as explained in more detail above, can in each case be embodied so as run obliquely or with line portions that are disposed so as to be mutually eccentric. In this instance, the oil from the lines 48 and 55 is in each case able to be directed into the bearing clearance 51, in the manner described in more detail above, in the main rotation direction HR or counter to the main rotation direction HR, and preferably by way of a correspondingly strong impulse.

In further embodiments it is additionally possible for the port region 56 to be disposed in the oil feed pocket 47 so as also to be offset from the port region 49 in the axial direction X of the friction bearing 41. Good cooling and lubricating of the friction bearing 41 here is achieved when the port region 56 of the line 55 is disposed within a sector S of which the center SM lies in the port region 49 of the line 48 and which encloses an angle γ of approximately 120°.

Figures 23, 23A:
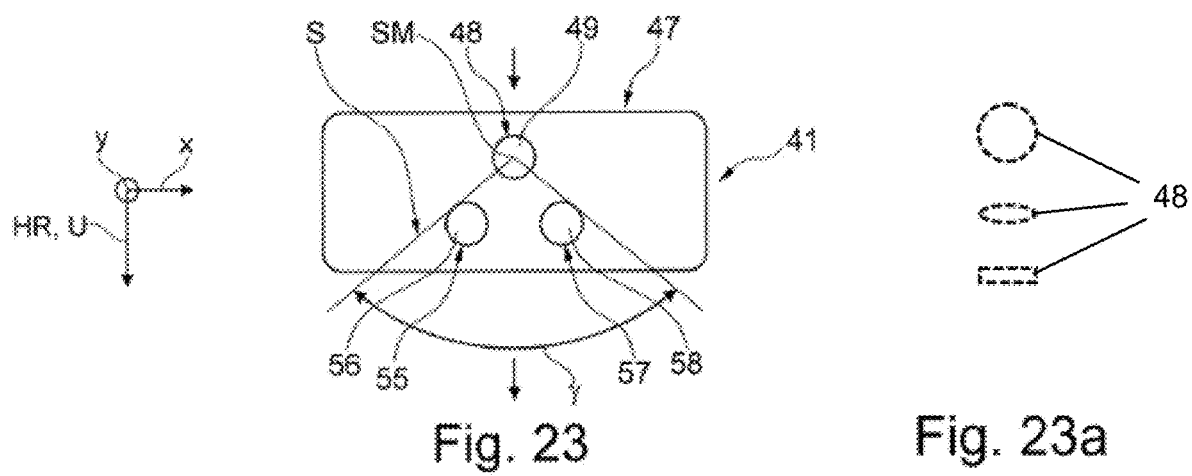
FIG. 23 shows an illustration, corresponding to that of FIG. 22, of a further embodiment of the planetary gearbox according to FIG. 3, wherein three lines open into the oil feed pocket, the port regions of said three lines being mutually disposed in a so-called A arrangement.
FIG. 23a shows circular, elliptic and slot-shaped ports.

FIG. 23 shows an illustration, corresponding to that of FIG. 22, of a further exemplary embodiment of the planetary gearbox 30 in which, besides the line 48, a second line 55 and a third line 57 open into the oil feed pocket 47. All the lines 48, 55 and 57 can be connected to the supply line 53, or, to the degree described later in the context of FIG. 33 to FIG. 37, be impinged with oil from different oil supply units.

Port regions 56 and 58 of the lines 55 and 57 are spaced apart from the port region 49 of the line 48 in the circumferential direction U of the friction bearing 41 as well as in the main rotation direction HR of the planet gear 32 and also in the axial direction X. The port regions 56 and 58 of the lines 55 and 57 here, in terms of the port region 49 of the line 48, in the axial direction X are disposed in the oil feed pocket 47 in such a manner that the port region 49 in the axial direction X is disposed between the port regions 56 and 58 of the lines 55 and 57. In this way, the port regions 49, 56 and 58 of the lines 48, 55 and 57 are present in a so-called mutual A arrangement which enables efficient cooling of the friction bearing 41 and, in comparison to known friction bearing embodiments, has the effect of reducing the temperature level in the friction bearing 41. The port regions 56 and 58 of the lines 55 and 57 are disposed in a sector S of which the center SM lies in the port region 49 of the line 48 and of which the opening angle γ corresponds to approximately 120°.

Figure 24:
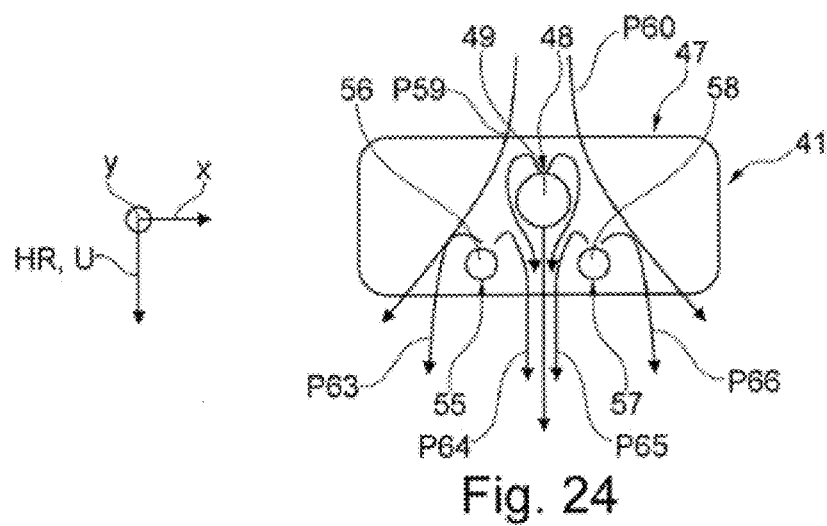
FIG. 24 shows an illustration, corresponding to that of FIG. 23, of the variant of the planetary gearbox according to FIG. 23, wherein flow paths of the oil that is introduced from the port regions of the three lines into the oil feed pocket and of dragged oil in the bearing clearance are in each case indicated.

Shown to a highly simplified degree in FIG. 24 is the oil flow in the bearing clearance 51 in the region of the oil feed pocket 47, in which the three lines 48, 55 and 57, or the port regions 49, 56 and 58 thereof, respectively, are mutually disposed to the degree described in the context of FIG. 23, and by way of which oil is in each case directed into the bearing clearance 47 counter to the rotation direction HR of the planet gear 32. The drawn lines P59 and P60 in FIG. 24 here represent the flow profile of dragged oil in the bearing clearance 51. The flow of the dragged oil in the circumferential direction U, or in the rotation direction HR, respectively, ahead of the oil feed pocket 47 runs substantially in the circumferential direction U. When flooding the oil feed pocket 47, the dragged oil, by the oil which by way of the lines 48, 55 and 57 is directed into the oil feed pocket 47, in the axial direction X—corresponding to the drawn lines P59 and P60—is increasingly displaced outward in the direction of the axially outer bearing sides of the friction bearing 41 and there ultimately squeezed out of the bearing clearance 51.

The displacement of the dragged oil in the bearing clearance 51 arises in particular when the cold oil from the lines 48, 55 and 57 is directed by way of a strong impulse into the bearing clearance 51 in the region of the oil feed pocket 47. By virtue of the temperature-related density differential between the fed cold oil and the dragged hot oil, only minor mixing of the hot dragged oil with the cold freshly fed oil takes place, as a result of which an increased load bearing capability of the friction bearing 41 is achieved.

Furthermore, the centric feeding of fresh oil ensures adequate cooling and lubricating of the highly loaded region in the circumferential region. The main flow direction of the freshly fed oil from the line 48 is indicated by the drawn lines P61 and P62 in FIG. 24. Additionally, the drawn lines P63 and P64 show the main flow direction of the oil which is directed into the oil feed pocket 47 by way of the line 55. Furthermore, the drawn lines P65 and P66 show the main flow direction of the oil which is directed into the oil feed pocket 47 by way of the line 57.

Figure 24A:
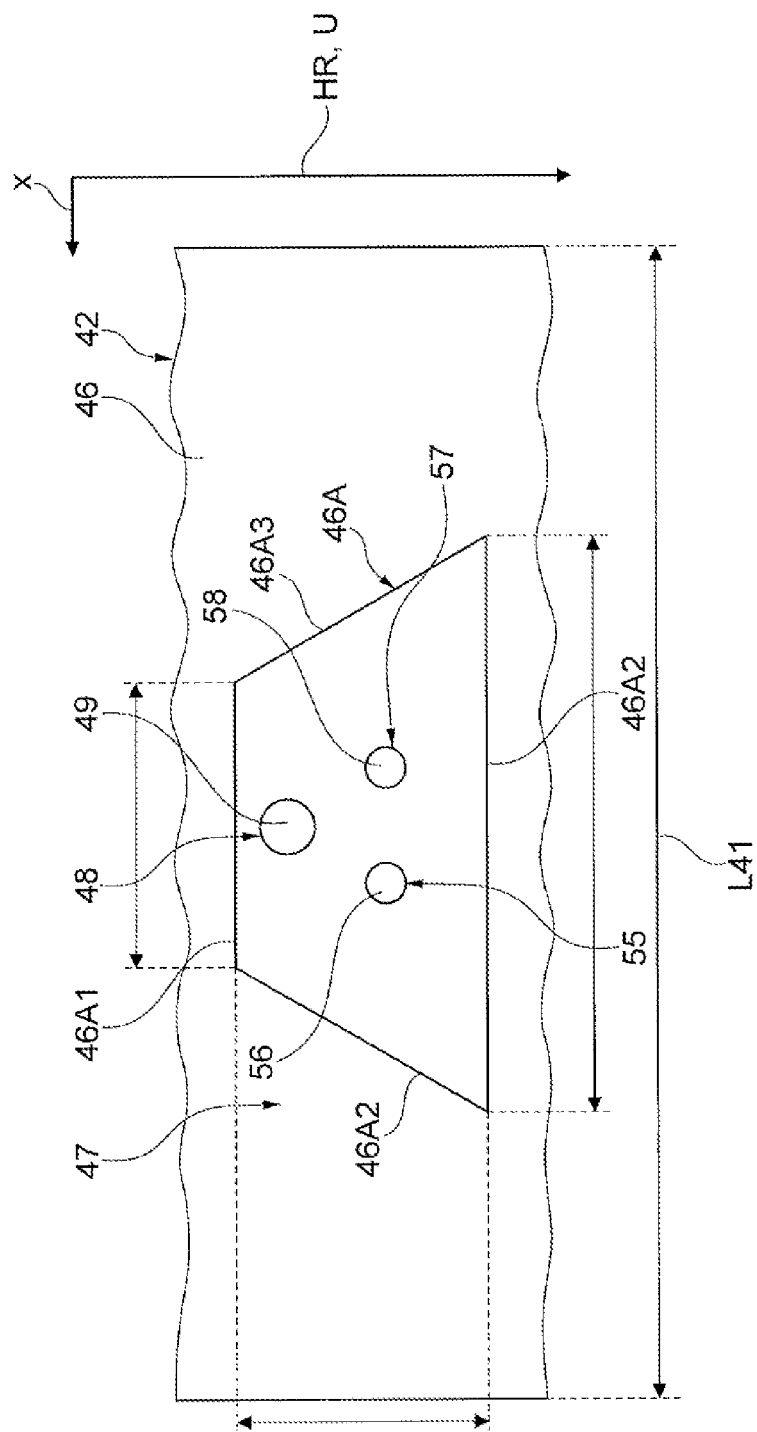
FIG. 24a shows a schematic two-dimensional view of a region of the first component in which the oil feed pocket having the port regions of the first, of the second and of the third line are provided.

FIG. 24a shows a schematic two-dimensional view of a region of the planet pin 42 in which the oil feed pocket 47 having the port regions 49, 56 and 58 of the first line 48, of the second line 55 and of the third line 57 is provided. A surface region 46A of the external side 46 of the planet pin 42, in which the port regions 49 to 58 of the lines 48 to 57 are disposed as a function of the specific application, is denoted more specifically about the port regions 49 to 58. The surface region 46A here is configured so as to be trapezoidal, wherein the two parallel sides 46A1, 46A2 of the surface region 46A run in the axial direction X of the friction bearing 41. The oblique sides 46A3, 46A4 of the surface region 46A that run between the parallel sides 46A1, 46A2 of the surface region 46A connect the shorter parallel side 46A1 to the longer parallel side 46A2 that in the circumferential direction X and in the main rotation direction HR follows the shorter parallel side 46A1. The spacing between the longer side 46A2 and the shorter side 46A1 in the circumferential direction U and in the main rotation direction HR of the planet gear is 10% of the entire bearing circumference of the friction bearing 41.

The surface region 46A in the axial direction X is provided in the bearing center of the friction bearing 41. The width, or the axial length of the shorter parallel side 46A1, respectively, is equal to 25% of the bearing width L41 of the friction bearing 41. The length of the longer parallel side 46A2 corresponds to 50% of the bearing width L41 of the friction bearing 41.

Figure 24B:
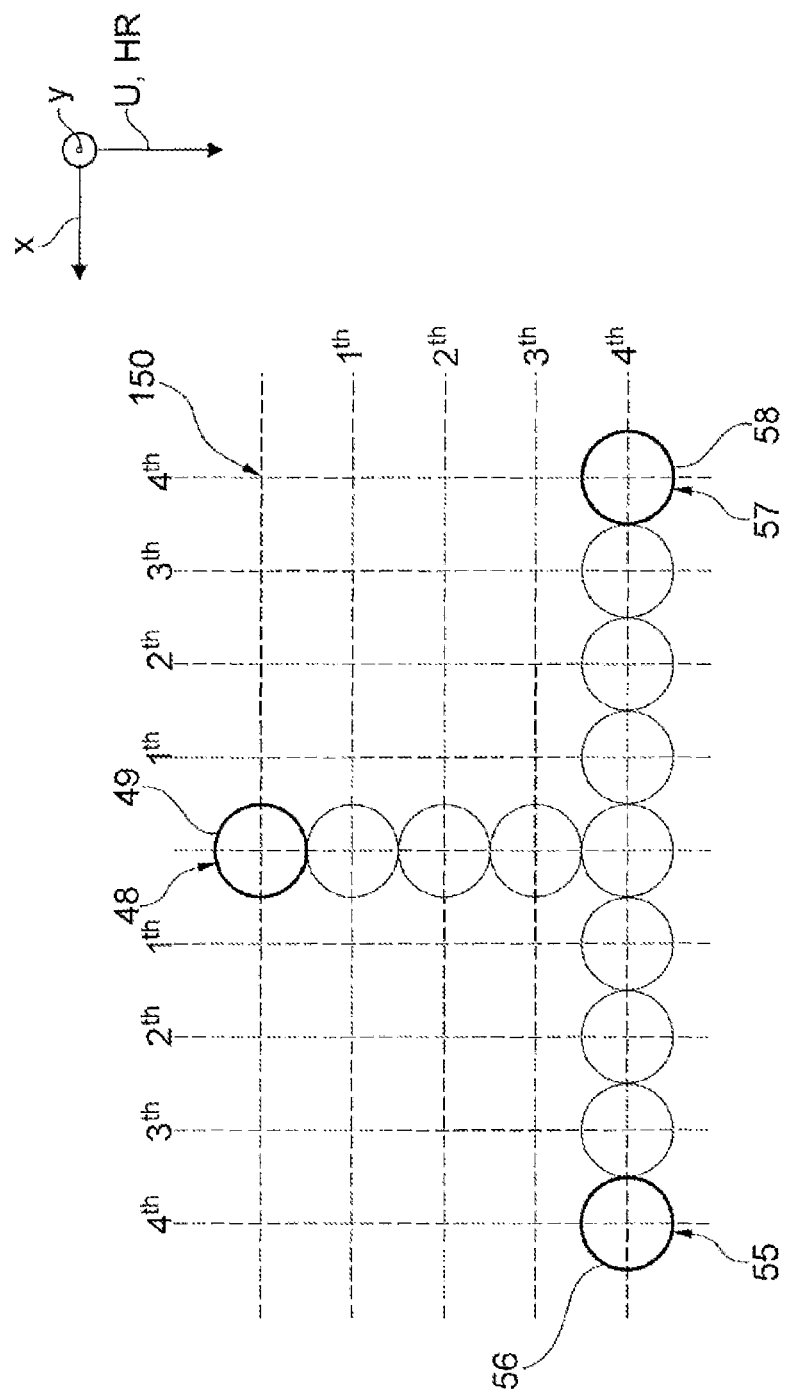
FIG. 24b shows a simplified illustration of the port regions of the first, of the second and of the third line.

FIG. 24b shows a simplified illustration of the port regions 49, 57 and 59 of the first line 48, of the second line 55 and of the third line 57, said port regions being based on an underlying grid pattern 150. The spacings between the intersection points of the grid lines of the grid pattern 160 here are equal to the diameter of the port region 49 of the first line 48. It can be derived from the illustration according to FIG. 24b that the center of the port region 49 of the first line 48 in the circumferential direction, or in the main rotation direction HR of the planet gear 32, respectively is spaced apart from the centers of the port regions 56 and 58 of the lines 55 and 57 by four times the diameter of the port region 49 of the first line 48. This value of the spacing in the circumferential direction U represents the maximum when four times the diameter of the port region 49 of the first line is less than one tenth of the entire bearing circumference of the friction bearing 41. In other instances, the tenth part of the entire circumference of the friction bearing 41 is provided as the maximum value for the maximum spacing in the circumferential direction between the center of the port region 49 and the centers of the port regions 56 and 58.

Additionally, the center of the port region 49 in the variant of arrangement of the port regions 49 to 57 shown in FIG. 24b in the axial direction X is in each case spaced apart from the port regions 56 and 58 by four times the diameter of the port region 49. These axial spacings again each represent maximum values within which the friction bearing 41 is ideally impinged with oil in order to achieve an ideally high load bearing capability of the friction bearing 41.

These values of the axial spacing of the centers of the port regions 56 and 58 from the port region 49 represent the maximum values when port regions 56 and 58 are disposed in the surface region 46A. In other instances, half the bearing width of the friction bearing 41 is provided as the maximum value for the arrangement of the port regions 56 and 58 in order to guarantee intense cooling of the friction bearing 41 to the desired degree.

Figure 25:
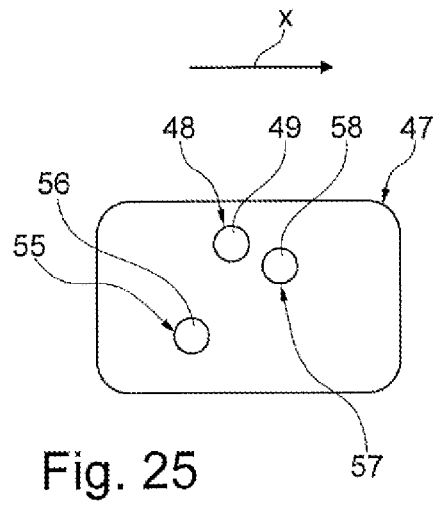
FIG. 25 to FIG. 27 show in each case illustrations, corresponding to that of FIG. 23, of further possibilities of disposing the port regions of the three lines within the oil feed pocket.
Figure 26:
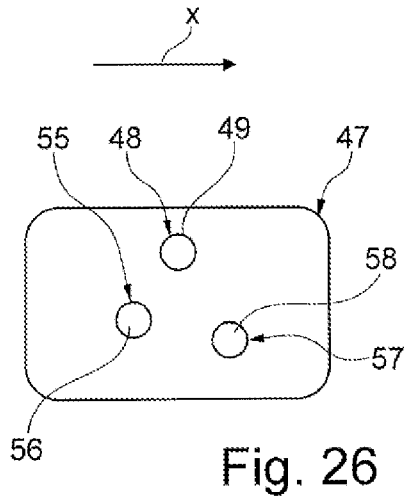
Figure 27:
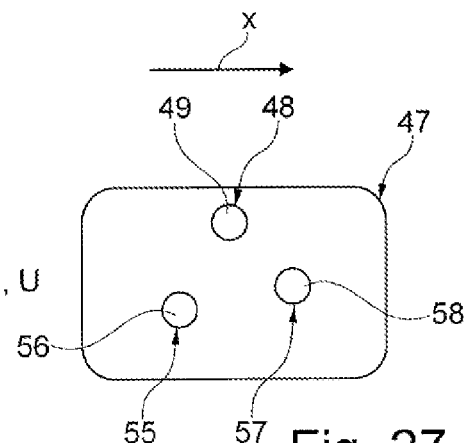

FIGS. 25 to 27 indicate further potential mutual arrangements of the port regions 49, 56 and 58 of the lines 48, 55 and 57 in the circumferential direction U and in the axial direction X. The mutual arrangements of the port regions 49, 56 and 58, and the spacings therebetween in the circumferential direction U and in the axial direction X, can vary as a function of the respective specific application in order to be able to cool the bearing clearance 51, or the friction bearing 41, as a function of the load. The port regions 49, 56 and 58 here are in each case present in the afore-described A arrangement.

Figure 28:
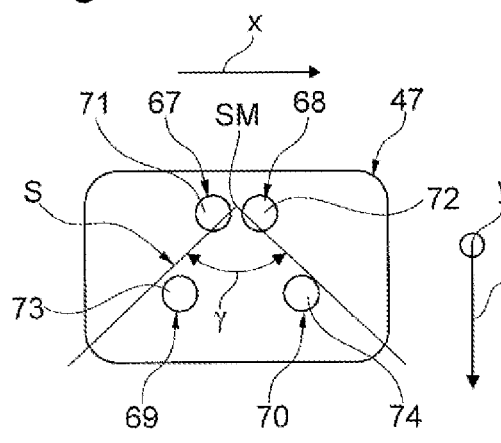
FIG. 28 to FIG. 30 show an illustration, corresponding to that of FIG. 23, of further embodiments of the planetary gearbox, in which four lines open in each case into the oil feed pocket.
Figure 30:
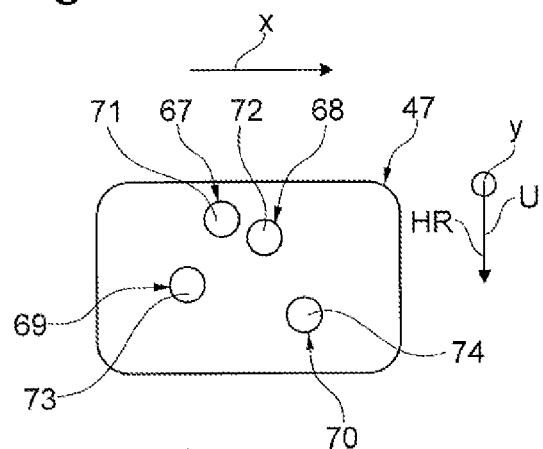
Figure 29:
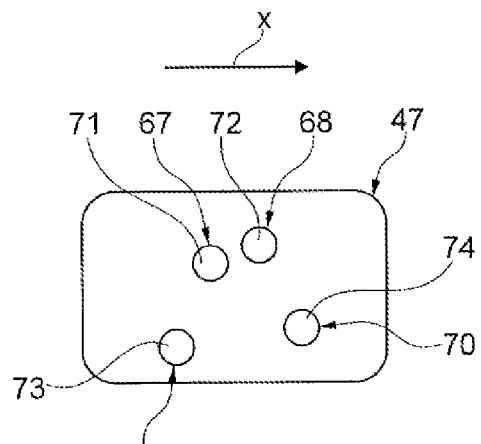

FIG. 28 to FIG. 30 each show illustrations, corresponding to that of FIG. 23, of further embodiments of the planetary gearbox 30, in which four lines 67 to 70 open in each case into the oil feed pocket 47, said four lines in each case being mutually spaced apart in the circumferential direction U, or in the rotation direction HR of the planet gear 32, respectively, and additionally in the axial direction X of the friction bearing 41.

In the exemplary embodiment illustrated in FIG. 28, the port regions 71 and 72 of the lines 67 and 68 are disposed at the same height level in the circumferential direction U, while port regions 73 and 74 of the lines 69 and 70 are spaced apart from the port regions 71, 72 of the lines 67, 68 in the circumferential direction U, or in the rotation direction HR of the planet gear 32, respectively. The port regions 73, 74 of the lines 69 and 70 are disposed in a sector S of which the center SM presently lies between the port regions 71, 72 of the lines 67, 68 and which has an opening angle γ of approximately 120°.

The port regions 71 and 72 of the lines 67 and 68 in the exemplary embodiment of the planetary gearbox 30 illustrated in FIG. 29 are mutually spaced apart in the circumferential direction U as well as in the axial direction X. Additionally, the port regions 73 and 74 of the lines 69 and 70 are mutually spaced apart in the circumferential direction U and in the rotation direction HR of the planet gear 32, and additionally also in the axial direction X. This also applies to the embodiment of the planetary gearbox 30 illustrated in FIG. 30.

In all embodiments of the planetary gearbox 30 illustrated in FIG. 28 to FIG. 30, the axial spacings between the port regions 71 and 72 of the lines 67 and 68, as well as between the port regions 73 and 74 of the lines 69 and 70 and the axial spacings of the port regions 71 to 74 of the lines 67 to 70, are mutually provided so that the port regions 67 and 68 in the axial direction each lie between the port regions 73 and 74 of the lines 69 and 70. This again results in a positive displacement of the dragged hot oil, to the degree described in the context of FIG. 24, in the outward axial direction X by the cool oil which is in each case directed in by way of the lines 67 to 74. As a result of the dragged oil being displaced from the bearing clearance 51, a desirably low temperature level in the bearing clearance 51 of the friction bearing 41 is achieved, and adequate cooling and lubricating of the highly loaded region of the friction bearing 41 is achieved, as a result of which the friction bearing 41 has a sufficiently high load bearing capability.

Figure 31:
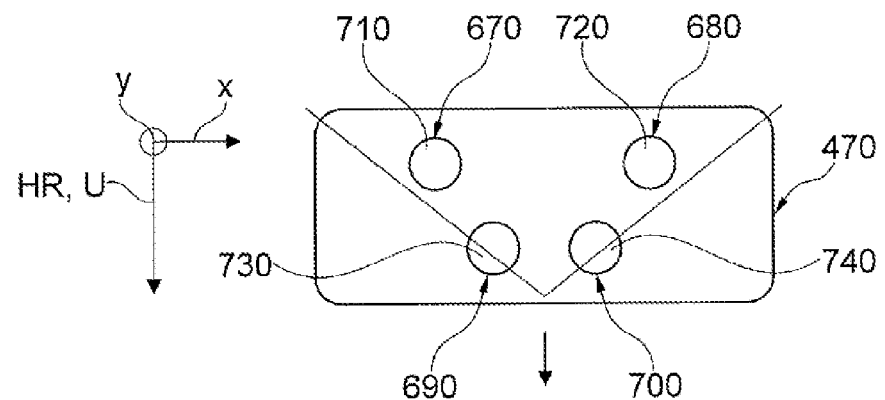
FIG. 31 shows an illustration, corresponding to that of FIG. 28, of an oil feed pocket having four port regions of a friction bearing, wherein the port regions are mutually positioned in a so-called V arrangement in the oil feed pocket of the friction bearing.

FIG. 31 shows an illustration, corresponding to that of FIG. 28, of an oil feed pocket 470 of a friction bearing known from the prior art. Four lines 670, 680, 690 and 700 likewise open into the oil feed pocket 470, the port regions 710 to 740 of said lines 670, 680, 690 and 700 being mutually positioned in a so-called V arrangement. The port regions 710 and 720 in the axial direction X of the oil feed pocket 470 here are farther spaced apart from one another than the port regions 730 and 740 of the lines 690 and 700 are spaced apart from a rotatable component in the circumferential direction, or in the rotation direction HR of said rotatable component, respectively. The port regions 730 and 740 in the axial direction are disposed between the port regions 710 and 720 of the lines 670 and 680. The main flow directions of the fresh oil that is directed from the lines 670 to 740 into the oil feed pocket 470 are indicated by the drawn lines P630, P640, P641, P642, P643, P644, P650 and P660 in FIG. 32.

Figure 32:
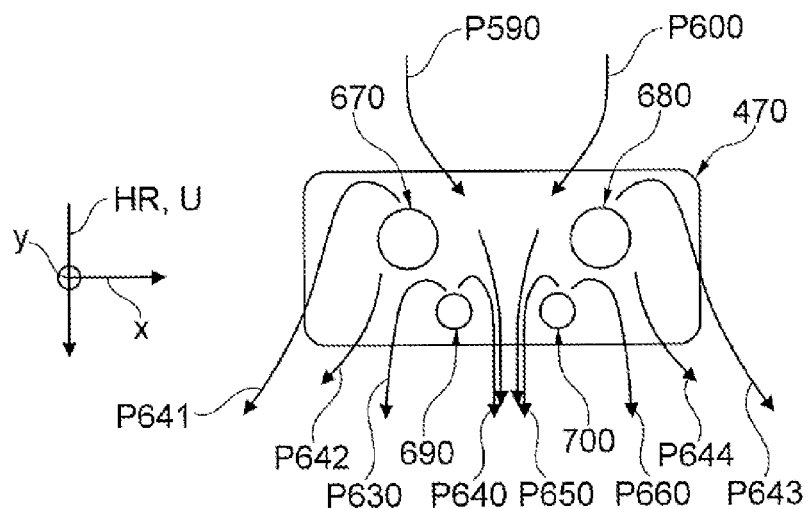
FIG. 32 shows an illustration, corresponding to that of FIG. 24, having flow paths of the fresh oil and of the dragged oil, said flow paths being in each case established by virtue of the V arrangement of the port regions of the lines into the oil feed pocket illustrated in FIG. 31.

This mutual arrangement of the port regions 710 and 740 leads to the hot dragged oil, according to the drawn lines P590 and P600 illustrated in FIG. 32, by the oil freshly directed into the oil feed pocket 470 being guided to an undesirable degree into the bearing center of the friction bearing. As a result, no displacement of the dragged oil in the direction of the external sides of the bearing takes place. Therefore, the temperature level in the bearing clearance 470 is not substantially reduced by feeding fresh cool oil.

Figure 33:
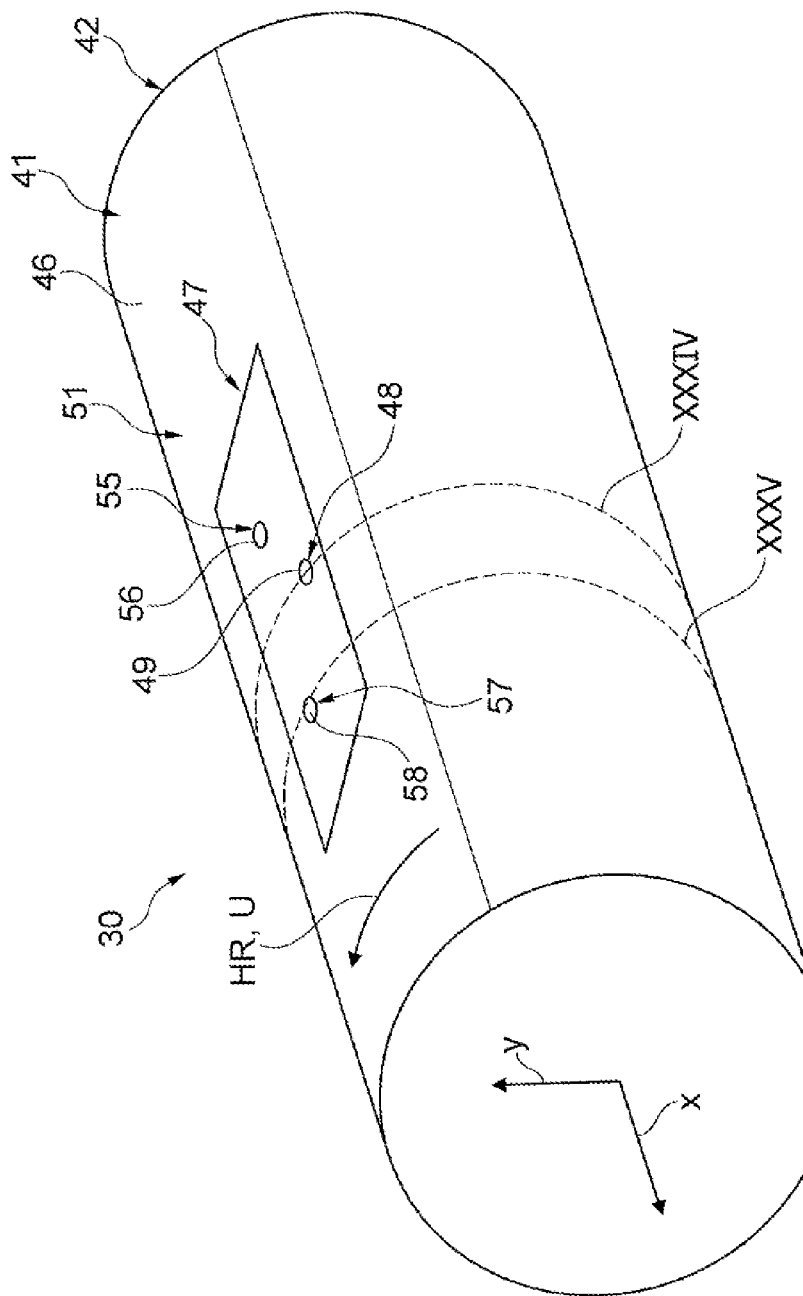
FIG. 33 shows an illustration, corresponding to that of FIG. 6, of a further embodiment of the planetary gearbox according to FIG. 3, having three lines of which the port regions are mutually disposed in the manner illustrated in more detail in FIG. 23.
Figure 34:
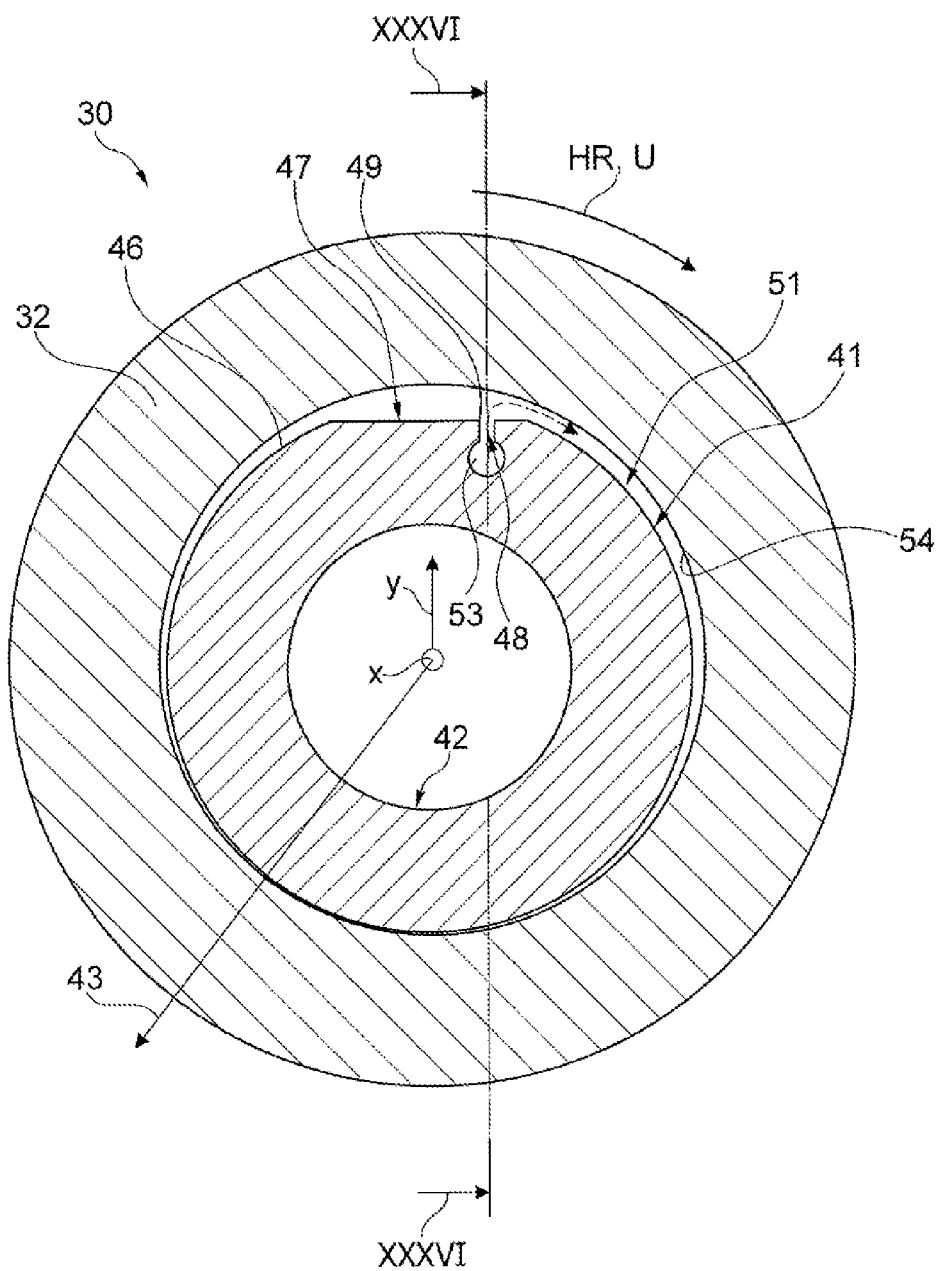
FIG. 34 shows an illustration, corresponding to that of FIG. 8, of the embodiment of the planetary gearbox according to FIG. 33 along a section line XXXIV-XXXIV denoted more specifically in FIG. 33.
Figure 35:
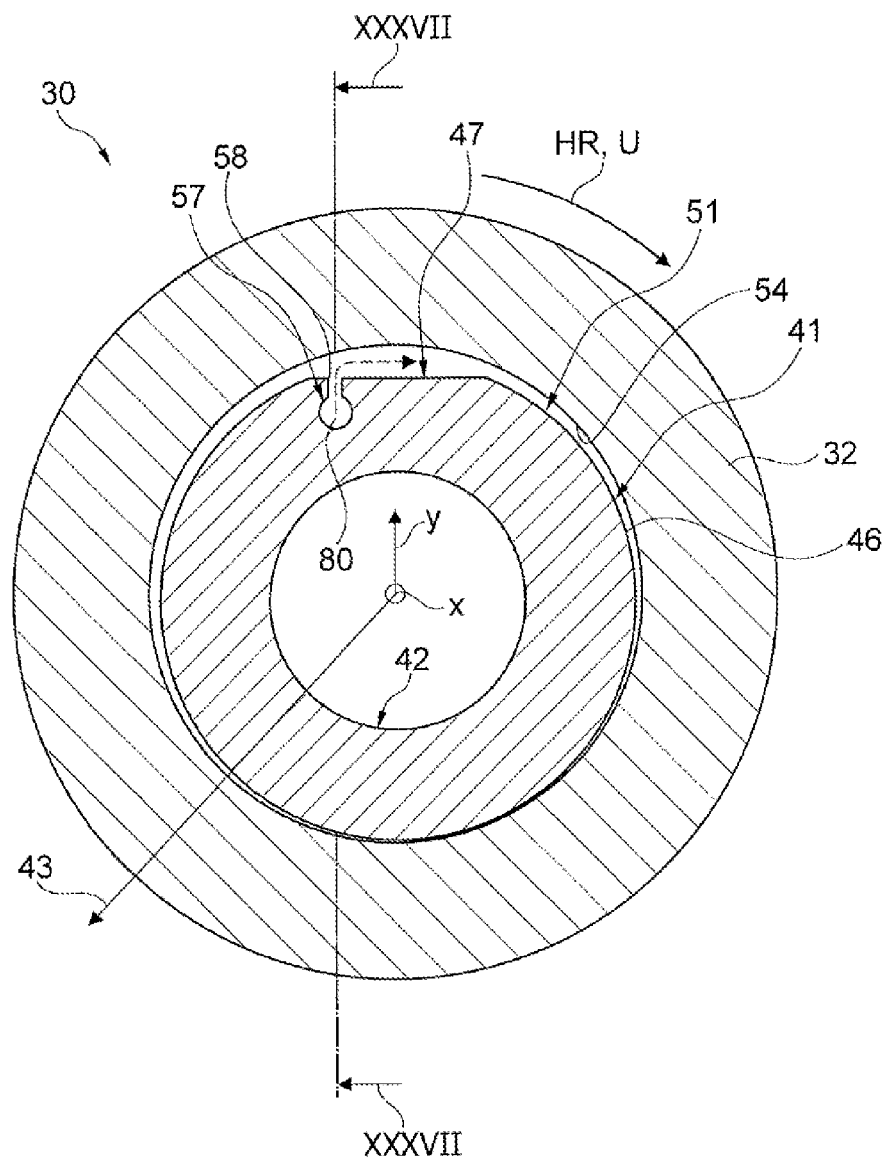
FIG. 35 shows an illustration, corresponding to that of FIG. 34, of the embodiment of the planetary gearbox according to FIG. 33 along the section line XXXV-XXXV denoted more specifically in FIG. 33.
Figure 36:
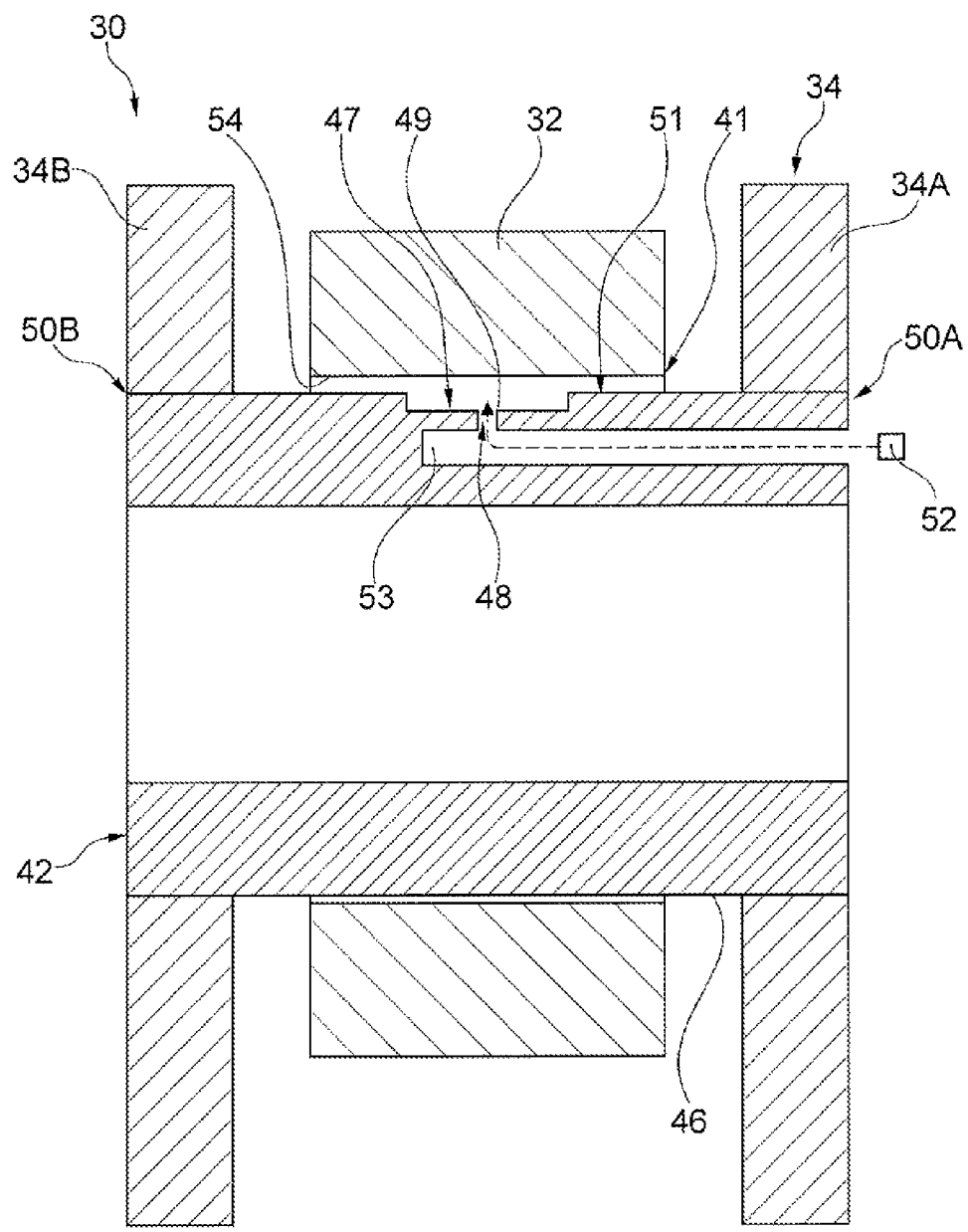
FIG. 36 shows a longitudinal sectional view of the planetary gearbox according to FIG. 33 along a section line XXXVI-XXXVI denoted more specifically in FIG. 34.
Figure 37:
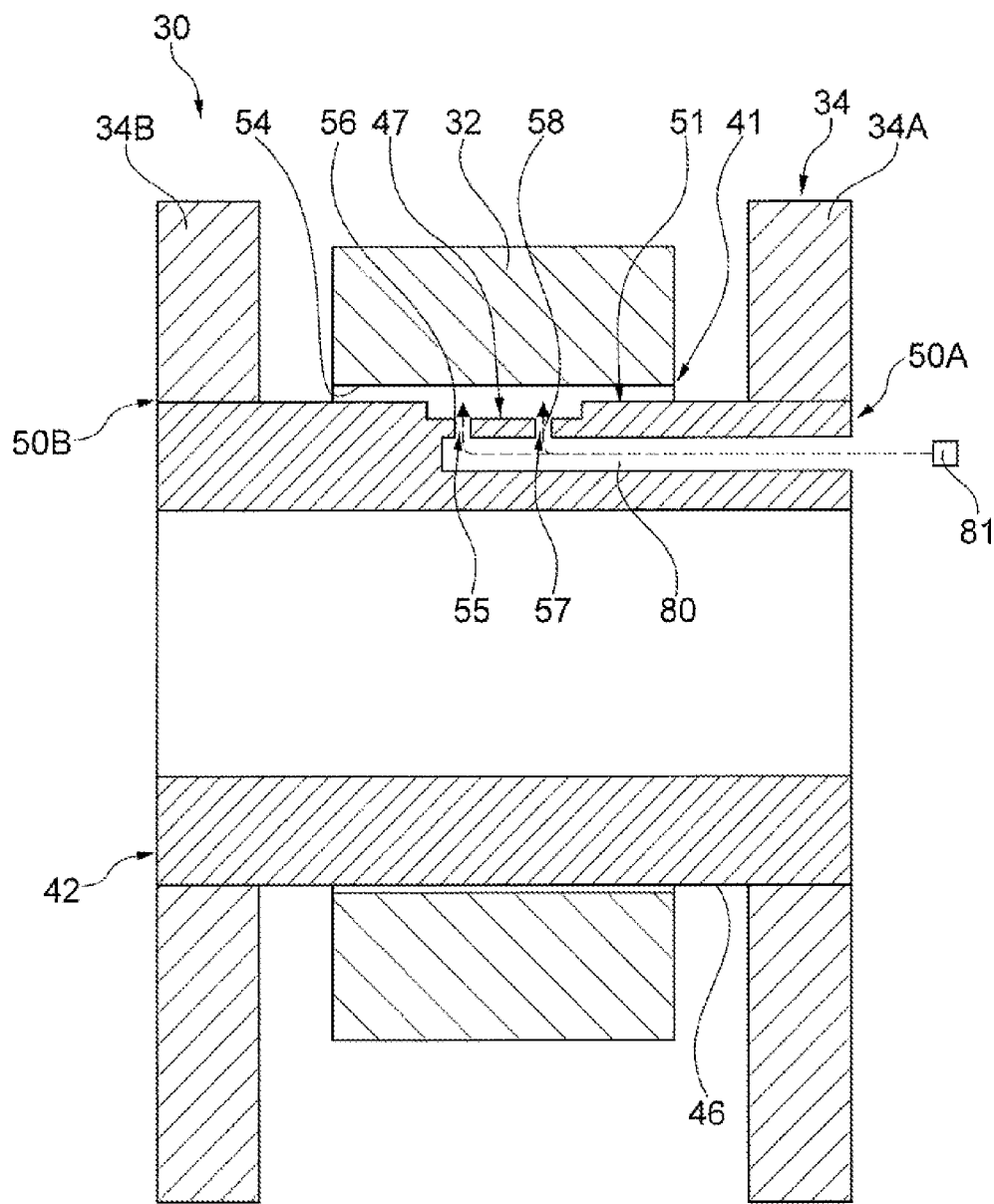
FIG. 37 shows an illustration, corresponding to that of FIG. 36, of the planetary gearbox according to FIG. 33 along a section line XXXVII-XXXVIII denoted more specifically in FIG. 35.

FIG. 33 shows an embodiment of a planet pin 42 in which the three lines 48, 55 and 57 are disposed in the oil feed pocket 47 and open into the latter to the degree described in the context of FIG. 23. FIG. 34 shows a cross-sectional view of an embodiment of the planetary gearbox 30 having the planet pin 42 according to FIG. 33, in a cross-sectional view along a section line XXXIV-XXXIV denoted more specifically in FIG. 33. Furthermore, FIG. 35 shows an illustration, corresponding to that of FIG. 34, of the planetary gearbox 30 along a section line XXXV-XXXV denoted more specifically in FIG. 33. Additionally illustrated in FIG. 36 is a longitudinal sectional view of the planetary gearbox 30 along a section line XXXVI-XXXVI denoted more specifically in FIG. 34. FIG. 37 shows an illustration, corresponding to that of FIG. 36, of the planetary gearbox along a section line XXXVII-XXXVII denoted more specifically in FIG. 35.

It is apparent from the illustrations according to FIG. 33 to FIG. 37 that the line 48 to the extent described in the context of FIG. 7, is supplied with pressurized oil from the oil supply unit 52 by way of the line 53. Additionally, the lines 55 and 57 are impinged with pressurized oil from a further oil supply unit 81 by way of a further line 80 which runs in the axial direction X in the planet pin 42. As a result of the separate embodiment of the oil supply units 52 and 81 there is the possibility to direct oil at a lower temperature into the bearing clearance 51 of the friction bearing 41 by way of the line 48 than by way of the lines 55 and 57. Moreover, the friction bearing 41 can continue to be supplied with oil by way of the respective other oil supply unit 81 or 52, even in the event of a functional failure of the oil supply unit 52 or of the oil supply unit 81.

The fresh volumetric flows of oil which are directed eccentrically into the bearing clearance 51 by way of the lines 55 and 57, and of which the temperature is higher than the temperature of the volumetric flow of oil that by way of the line 48 is directed into the bearing clearance 51 axially between the volumetric flows of oil from the lines 55 and 57, counteract any proliferation of the cooler and centrically fed volumetric flow of oil in the axial direction X of the bearing clearance. The lubricant from the line 48, in the manner illustrated in FIG. 38, is kept in the axial center of the friction bearing 41 by being blocked by the warmer lubricant flows from the lines 55 and 57.

As a result of the two mutually separated oil supplies into the oil feed pocket 47, the latter being characterized by a feed of cool oil in the axial center of the oil feed pocket 47 and by eccentric feeds of warmer lubricant, the tightest lubrication clearance of the friction bearing 41 is again cooled to the desired degree. A high load bearing capability of the friction bearing 41 is also achieved by the viscosity of the oil in the bearing clearance 51, said viscosity being a result of the positive cooling. Furthermore, the quantity of the fresh lubricant used can also be reduced in comparison to conventionally embodied friction bearings. As a result, the cooling circuit of the high performance gearbox 30 can be designed more efficiently and smaller.

Figure 38:
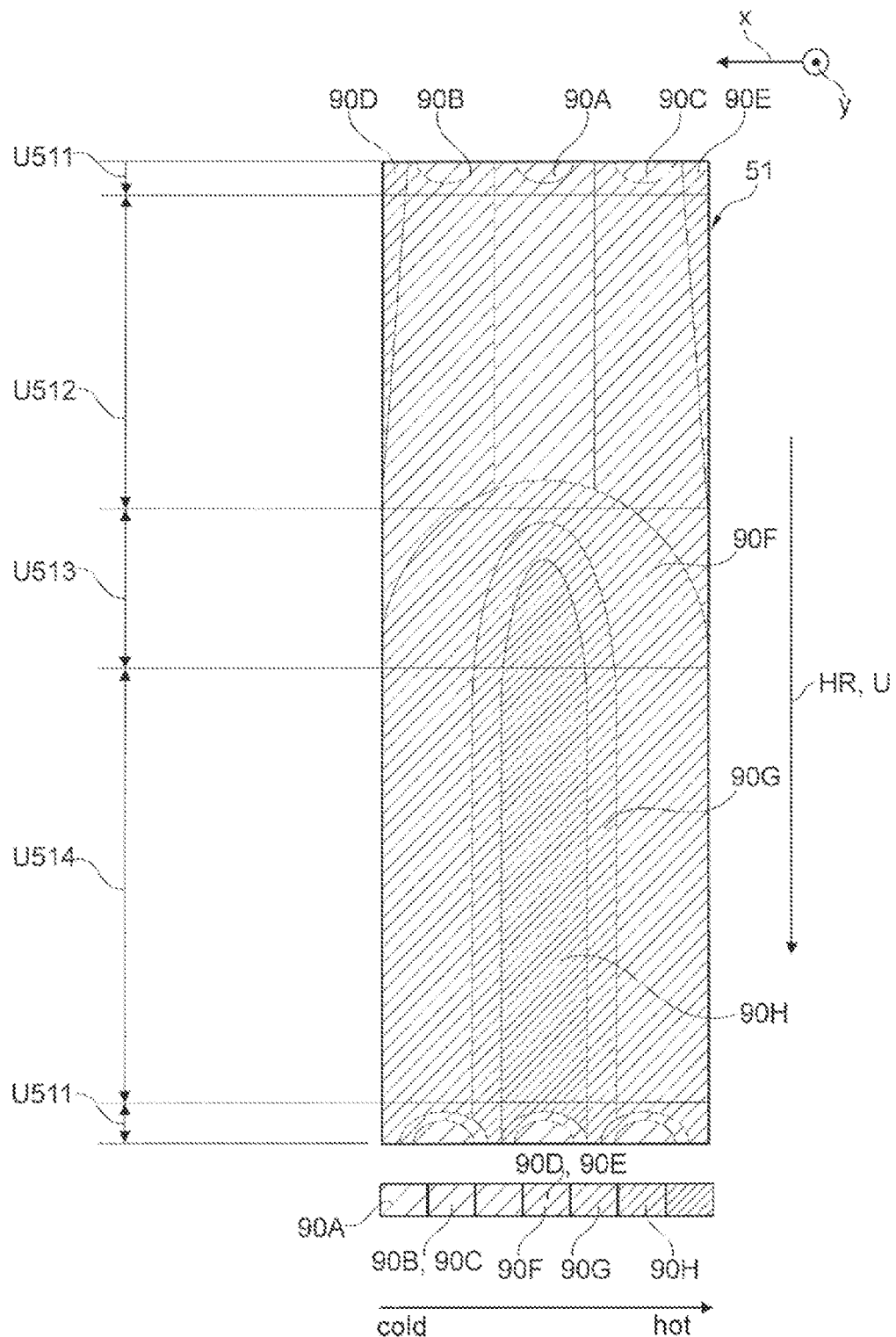
FIG. 38 shows an illustration, corresponding to that of FIG. 21, of a developed view of the bearing clearance of the friction bearing of the planetary gearbox according to FIG. 33, having temperature zones extending in the circumferential direction and in the axial direction of the friction bearing.

FIG. 38 shows an illustration, corresponding to that of FIG. 21, of the bearing clearance 51 of the planetary gearbox 30 according to FIG. 33 to FIG. 37. By virtue of the oil that is directed at different oil temperatures into the bearing clearance 51, different temperature zones 90A to 90H, which extend in the circumferential direction U and in the axial direction X of the friction bearing 41, are established in the bearing clearance 51 in the operation of the planetary gearbox 30. The bearing clearance 51 in the circumferential direction U as well as in the main rotation direction HR of the planet gear 32 here is again sub-divided into a plurality of circumferential regions U511 to U514. The circumferential regions U511 to U514 correspond substantially to the circumferential regions U511 to U514 of the bearing clearance 51 that have been specified in more detail in the context of FIG. 21.

The temperature zone 90A in the bearing clearance 51 is established in the region in which the cooler oil is directed into the oil feed pocket 47 by way of the line 48. The further temperature zones 90B and 90C in which the temperature of the oil is higher than the temperature of the oil in the temperature zone 90A are in each case illustrated next to the temperature zone 90A in the axial direction X. The temperatures of the oil in the temperature zones 90A and 90B and 90C here correspond in each case to the feed temperatures of the oil from the line 48, or from the lines 55 and 57, respectively. As a result of the volumetric flows of oil controlled to different temperatures that from the lines 48, or 55 and 57, respectively, are directed into the oil feed pocket 47 in or counter to the rotation direction HR, the further temperature zones 90A1, 90B1 and 90C1 are established in the rotation direction HR after the temperature zones 90A and 90B and 90C in the bearing clearance 51. The temperature of the oil in the temperature zone 90A1 is higher than in the temperature zone 90A, because the oil on the internal side 54 of the planet gear 32 is heated by the planet gear 32 as well as by the dragged oil in the bearing clearance 51. The same applies to the temperature zones 90B1 and 90C1 in which the temperature level of the oil is higher than in the temperature zones 90B and 90C.

Further temperature zones 90D and 90E in which the oil temperature is again higher than in the temperature zones 90B1 and 90C1 are in each case established next to the temperature zones 90B1 and 90C1. The reason for this is that oil in the axial direction X is pushed laterally out of the bearing clearance 51 in the temperature zones 90D and 90E. The oil that is pushed out has a lower temperature in comparison to the dragged oil. This is the case because the dragged oil has been cooled by the fresh cool oil which has been directed into the bearing clearance 51 by way of the lines 48, 55 and 57.

By virtue of the bearing clearance 51 that narrows on the circumference, or the converging bearing clearance 51, respectively, and the increasing load on the friction bearing 41, the temperature of the oil in the bearing clearance 51, just before the transition between the circumferential regions U512 and U513, increases across substantially the entire bearing width. The at least approximately arcuate temperature zone 90F in which the oil has a higher temperature level than in the temperature zones 90B1 and 90C1 results from the temperature increase in the oil.

Once the oil reaches the circumferential region U513 of the friction bearing 41, in which the tightest lubrication clearance is present by virtue of the load engaging thereon, significant heating of the lubricant in the bearing clearance 51 arises again. This leads to two further temperature zones 90G and 90H being established in the axial direction as well as in the circumferential direction within the temperature zone 90F. The temperature zone 90G is formed between the temperature zone 90F and the inner temperature zone 90H in which the oil temperature is the highest.

In the circumferential region U514, in which the lubrication clearance, or the height of the bearing clearance 51 steadily increases again in the main rotation direction HR of the planet gear 52, the oil temperature in the temperature zones 90F to 90H remains substantially the same. The circumferential region U514 of the bearing clearance 51 here again comprises the afore-described region of the bearing clearance 51 which is only partially filled with oil. The circumferential region U514 is then again adjoined by the circumferential region U511 in which fresh and cool oil is again directed into the bearing clearance 51 by way of the lines 48, 55 and 57.

The port regions 49, 56 and 58, or 71 to 74, respectively, of the lines 48, 55, 57 or 67 to 70, respectively, depending on the respective specific application, can in each case have flow cross sections of different sizes. As a result, the oil can be directed into the oil feed pocket 47 and thus also into the bearing clearance 51 in the direction of the internal side 54 of the planet gear 32 by way of different impulses, so as to displace the dragged oil in the bearing clearance 51 in the outward axial direction X in the desired manner.

LIST OF REFERENCE SIGNS

9 Main rotation axis
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Gearbox, planetary gearbox
32 Planet gear
34 Planet carrier
34A, 34B Side plates
36 Linkage
38 Ring gear
40 Linkage
41 Friction bearing
42 Planet pin
42A, 42B, 42C Outside diameter of the planet pin
43 Arrow, main load direction
44 Direction of rotation of the planet gear
45 Radially outer point of the planet pin
46 External side of the planet pin
46A Surface region of the external side 46 of the planet pin
46A1, 46A2 Parallel sides of the surface region 46A
46A3, 46A4 Oblique sides of the surface region 46A
47 Oil feed pocket 48 Line
49 Port region of the line 48
50A, 50B Bores of the side walls 34A, 34B
51 Bearing clearance
51A, 51A1, 51A2 Temperature zones of the bearing clearance 51
51B, 51B1 Temperature zones of the bearing clearance 51
51C to 51E Temperature zones of the bearing clearance 51
51DF Region of the temperature zone 51D of the bearing clearance 51
52 Oil supply unit
53 Supply line
54 Internal side of the planet gear
55 Further line, second line
56 Port regions of the line 55
57 Third line
58 Port region of the third line
67 First line
68 Second line
69 Third line
70 Fourth line
71 Port region of the first line 67
72 Port region of the second line 68
73 Port region of the third line 69
74 Port region of the line 70
80 Line
81 Further oil supply unit
90A, 90A1 Temperature zones of the bearing clearance 51
90B, 90B1 Temperature zones of the bearing clearance 51
90C, 90C1 Temperature zones of the bearing clearance 51
90E to 90H Temperature zones of the bearing clearance 51
100A to 100H Temperature zones of the bearing clearance 100
150 Grid pattern
470 Oil feed pocket
670 First line
680 Second line
690 Third line
700 Fourth line
710 Port region of the first line 670
720 Port region of the second line 680
730 Port region of the third line 690
740 Port region of the line 700
A Core air flow
AUF Impact region
B Air flow
FD Bearing force component
FF Bearing force component
HR Main rotation direction of the planet gear
L41 Bearing width of the friction bearing 41
phi Angle
P59, P50 Flow of dragged oil
P61 to P66 Flow of fresh oil
P590, P600 Flow of dragged oil
P630 to 660 Flow of cool oil
S Sector
SM Center of the sector
U Circumferential direction
U101 to U104 Circumferential region of the bearing clearance 100
U511 to U514 Circumferential region of the bearing clearance 51
X Axial direction
Y Radial direction
Z14, Z16 Feed direction
α, β, γ Angle

The invention claimed is:

1. A friction bearing of a planetary gearbox, comprising:
a rotationally fixed first component and a second component rotatably connected thereto,
an oil feed pocket positioned on the first component and configured to direct oil into a bearing clearance between the first and second components,
a first port connected to a first line opening into the oil feed pocket, and configured for directing the oil into the oil feed pocket,
an oil supply unit by which the oil is fed to the bearing clearance at a defined pressure, wherein the oil supply unit and a flow cross section of the first line is specified so that a ratio between a first factor being a product of a square of a velocity of the oil from the first line being directed into the bearing clearance and a density of the oil, and a second factor being a product of a square of a velocity of the oil adhering to the second component and the density of the oil, wherein the ratio is at least $5 \times 10^{-3}$.

2. The friction bearing according to claim 1, wherein the first line has an expanding width in a circumferential direction of the bearing clearance.

3. The friction bearing according to claim 1, and further comprising a second port connected to a second line opening into the oil feed pocket, and configured for directing the oil into the oil feed pocket, the second port trailing the first port in a rotation direction of the second component and spaced apart from the first port in an axial direction of the friction bearing.

4. The friction bearing according to claim 3, and further comprising a third port connected to a third line opening into the oil feed pocket, and configured for directing the oil into the oil feed pocket, the third port in a circumferential direction having a same spacing from the first port as the second port has from the first port in the circumferential direction, and in an axial direction, the third port is spaced apart from the first port and the second port with the first port being positioned between the second port and the third port in the axial direction.

5. The friction bearing according to claim 4, wherein axial spacings between the first, second and third ports and spacings between the first, second and third ports in the circumferential direction of the bearing clearance and in the rotation direction of the second component in relation to the first component are arranged so that the second port and the third port are disposed within a sector, the sector originating at the first port, extending in the rotation direction of the second component, and enclosing an angle of approximately 120°.

6. The friction bearing according to claim 4, and further comprising a fourth port connected to a fourth line opening into the oil feed pocket, the fourth port being spaced apart from the first port in the axial direction, in the circumferential direction of the bearing clearance and in the rotation direction of the second component in relation to the first component, wherein the first port and the fourth port in the axial direction of the friction bearing are disposed between the second port and the third port.

7. The friction bearing according to claim 6, wherein axial spacings between the first, second, third and fourth ports as well as spacings between the first, second, third and fourth ports in the circumferential direction of the bearing clearance and in the rotation direction of the second component in relation to the first component are arranged so that the second and third ports trail the first and fourth ports and are disposed within a sector, the sector originating between the first port and the fourth port, extending in the rotation direction of the second component, and enclosing an angle of approximately 120°.

8. The friction bearing according to claim 6, wherein the first port or the first port and the fourth port is/are disposed in an axially center region of the friction bearing which extends across at most 25% of an axial bearing width of the friction bearing.

9. The friction bearing according to claim 6, wherein at least one chosen from the first, second, third and fourth ports is embodied to be circular, elliptic or slot-shaped.

10. The friction bearing according to claim 6, wherein a size of an opening cross section of the first port and/or a size of an opening cross section of the fourth port deviates from a size of an opening cross section of the second port and/or from a size of an opening cross section of the third port.

11. The friction bearing according to claim 6, wherein the first line and/or the fourth line are/is impinged by oil from a first oil circuit, and the second line and/or the third line are/is impinged by oil from a second oil circuit.

12. The friction bearing according to claim 4, wherein the second port and the third port are disposed in an axially center region of the friction bearing which extends across at most 50% of the axial bearing width of the friction bearing.

13. The friction bearing according to claim 4, wherein a spacing between the first port and the third port in a circumferential direction and in the rotation direction of the second component corresponds to at most four times a diameter of an opening cross section of the first port, or to at most 10% of an entire bearing circumference of the friction bearing.

14. The friction bearing according to claim 4, wherein axial spacings between the first port and the second port, as well as between the first port and the third port, each correspond to at most four times a diameter of an opening cross section of the first port.

15. The friction bearing according to claim 3, wherein a spacing between the first port and the second port in a circumferential direction and in the rotation direction of the second component corresponds to at most four times a diameter of an opening cross section of the first port, or to at most 10% of an entire bearing circumference of the friction bearing.

16. The friction bearing according to claim 1, wherein the oil feed pocket and/or the first port is disposed in an axial extent of the friction bearing.

17. The friction bearing according to claim 1, wherein the oil feed pocket and/or the first port is disposed off-center in an axial extent of the friction bearing to be axially eccentric in the friction bearing.

* * * * *